United States Patent
Minamino et al.

(10) Patent No.: US 7,319,645 B2
(45) Date of Patent: Jan. 15, 2008

(54) RECORDING APPARATUS AND RECORDING METHOD FOR RECORDING DATA TO A REWRITABLE RECORDING MEDIUM, AND REWRITABLE RECORDING MEDIUM

(75) Inventors: Junichi Minamino, Nara (JP); Hironori Deguchi, Osaka (JP); Toshiya Akagi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 544 days.

(21) Appl. No.: 10/633,769

(22) Filed: Aug. 4, 2003

(65) Prior Publication Data

US 2004/0027940 A1 Feb. 12, 2004

(30) Foreign Application Priority Data

Aug. 7, 2002 (JP) .............................. 2002-229765

(51) Int. Cl.
*G11B 7/12* (2006.01)
*G11B 5/09* (2006.01)
(52) U.S. Cl. ..................... 369/47.3; 714/752
(58) Field of Classification Search .............. 369/47.3; 714/752
See application file for complete search history.

(56) References Cited

U.S. PATENT DOCUMENTS 5,117,313 A * 5/1992 Lokhoff et al. ............... 360/40
6,084,536 A * 7/2000 Arts ............................ 341/58
6,091,698 A   7/2000 Hogan
6,128,260 A * 10/2000 Tanoue et al. ........... 369/59.25
6,195,778 B1 * 2/2001 Tran .......................... 714/752
6,510,116 B1 * 1/2003 Miyagawa et al. ...... 369/59.12
6,650,607 B1 * 11/2003 Kando et al. ............ 369/59.24

FOREIGN PATENT DOCUMENTS

JP      9-219022      8/1997

OTHER PUBLICATIONS

Chinese Office Action for corresponding Application No. 03804222.3 dated May 11, 2007 (English translation provided).

* cited by examiner

*Primary Examiner*—Gautam R. Patel
(74) *Attorney, Agent, or Firm*—Renner, Otto, Boisselle & Sklar, LLP

(57) ABSTRACT

A recording apparatus for recording modulated data on a rewritable recording medium includes a data modulation section for modulating data in accordance with a prescribed modulation rule; a parameter value changing section for changing at least one parameter value of the prescribed modulation rule; and a recording section for recording the data modulated in accordance with the prescribed modulation rule on the recording medium.

12 Claims, 23 Drawing Sheets

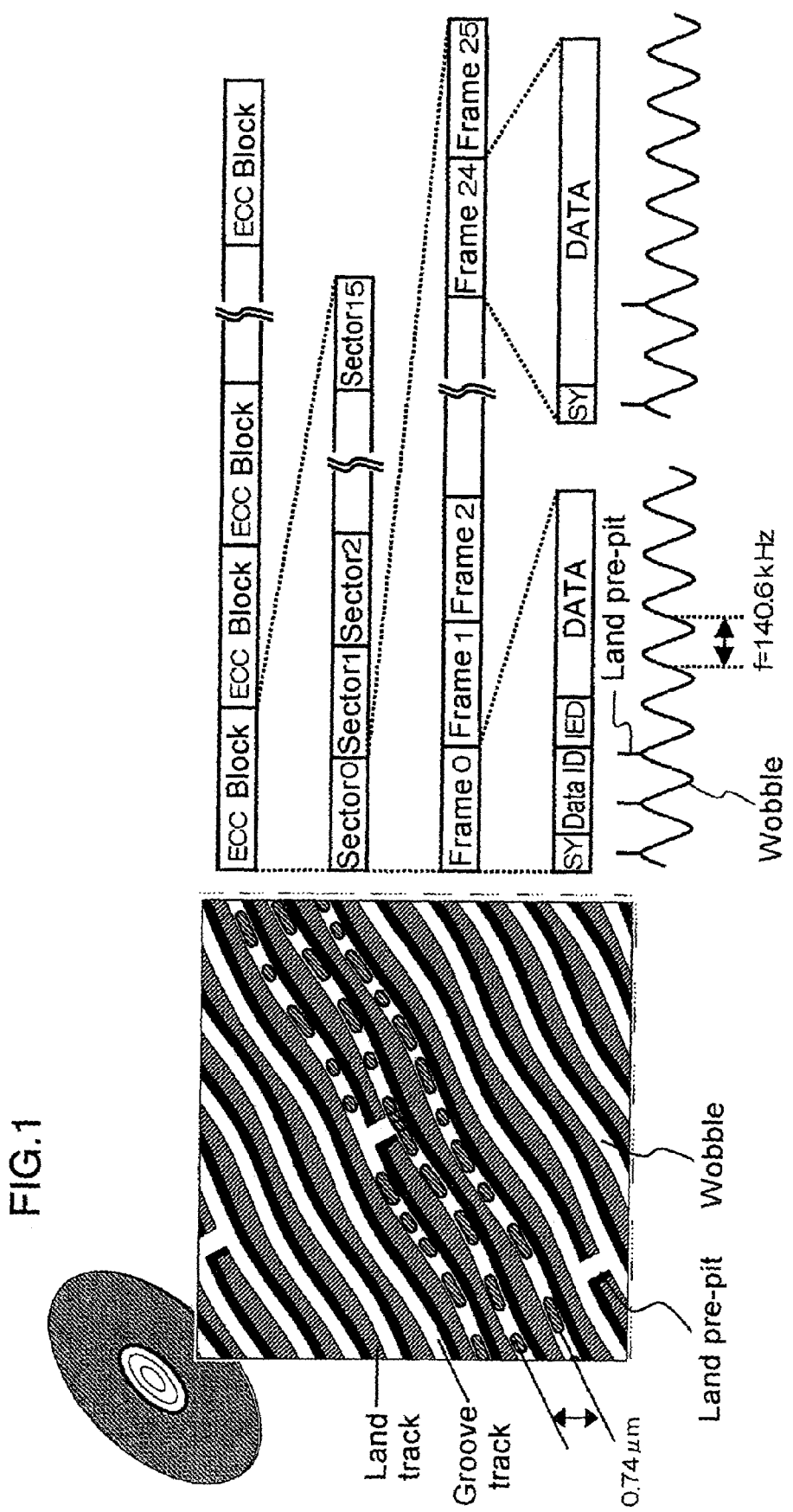

FIG.2

| bit2 | bit1 | bit0 | Meaning |
|---|---|---|---|
| 1 | 1 | 1 | EVEN sync |
| 1 | 1 | 0 | ODD sync |
| 1 | 0 | 1 | Data "1" |
| 1 | 0 | 0 | Data "0" |

FIG.3

|  | bit0 | bit1-4 | bit5-12 |  |
|---|---|---|---|---|
|  | SYNC | RA | DATA |  |
| 0 |  | 0000b | 1st byte of ECC Block address | PartA |
| 1 |  | 0001b | 2st byte of ECC Block address |  |
| 2 |  | 0010b | 3st byte of ECC Block address |  |
| 3 |  | 0011b | 1st byte of Parity A |  |
| 4 |  | 0100b | 2st byte of Parity A |  |
| 5 |  | 0101b | 3st byte of Parity A |  |
| 6 |  | 0110b | Field ID(00h) | PartB |
| 7 |  | 0111b | 1st byte of ECC Block address |  |
| 8 |  | 1000b | 2st byte of ECC Block address |  |
| 9 |  | 1001b | 3st byte of ECC Block address |  |
| 10 |  | 1010b | reserved |  |
| 11 |  | 1011b | reserved |  |
| 12 |  | 1100b | reserved |  |
| 13 |  | 1101b | 1st byte of Parity B |  |
| 14 |  | 1110b | 2st byte of Parity B |  |
| 15 |  | 1111b | 3st byte of Parity B |  |

FIG.9A

Main conversion table (data section)

| Data symbol | State 1 | | State 2 | | State 3 | | State 4 | |
|---|---|---|---|---|---|---|---|---|
| | Code word | Next state | Code word | Next state | Code word | Next state | Code word | Next state |
| 0 | 0010000000001001 | 1 | 0100001001000000 | 2 | 0010000000001001 | 1 | 0100000100100000 | 2 |
| 1 | 0010000000010010 | 1 | 0010000000010010 | 1 | 1000000100100000 | 3 | 1000000100100000 | 3 |
| 2 | 0010000100100000 | 2 | 0010000100100000 | 2 | 1000000000010010 | 1 | 1000000000010010 | 1 |

FIG.9B

Sub conversion table (data section)

| Data symbol | State 1 | | State 2 | | State 3 | | State 4 | |
|---|---|---|---|---|---|---|---|---|
| | Code word | Next state | Code word | Next state | Code word | Next state | Code word | Next state |
| 0 | 000001001000000000 | 4 | 000001001000000000 | 4 | 010010000100001000 | 2 | 010010000100001000 | 2 |
| 1 | 000100100000000000 | 4 | 000010010000000000 | 4 | 010010000100001000 | 3 | 010010000100001000 | 3 |
| 2 | 000100100000000000 | 4 | 000100100000000000 | 4 | 010010000000001001 | 1 | 010010000000001001 | 1 |

◂ State information bit

FIG.10A

| Frame number | Sync number |
|---|---|
| 1 | SY0 |
| 2 | SY5 |
| 3 | SY1 |
| 4 | SY5 |
| 5 | SY2 |
| 6 | SY5 |
| 7 | SY3 |
| 8 | SY5 |
| 9 | SY4 |
| 10 | SY5 |
| 11 | SY1 |
| 12 | SY6 |
| 13 | SY2 |
| 14 | SY6 |
| 15 | SY3 |
| 16 | SY6 |
| 17 | SY4 |
| 18 | SY6 |
| 19 | SY1 |
| 20 | SY7 |
| 21 | SY2 |
| 22 | SY7 |
| 23 | SY3 |
| 24 | SY7 |
| 25 | SY4 |
| 26 | SY7 |

FIG.10B

Main conversion table (sync section)

| Sync number | State 1 / State 2 Sync code | State 3 / State 4 Sync code |
|---|---|---|
| SY0 | 0001001001001000000010001 | 1001001000010000000010001 |
| SY1 | 0000010000000001000000010001 | 1000010010001000000010001 |
| SY2 | 0001000000000001000000010001 | 1000100010001000000010001 |
| SY3 | 0000010000000001000000010001 | 1000001001001000000010001 |
| SY4 | 0100010001000001000000010001 | 1000100010001000000010001 |
| SY5 | 0010010010001000000010001 | 1001001000010000000010001 |
| SY6 | 0010010010001000000010001 | 1001000010001000000010001 |
| SY7 | 0010010010001000000010001 | 1000100010001000000010001 |

FIG.10C

Sub conversion table (sync section)

| Sync number | State 1 / state 2 Sync code | State 3 / state 4 Sync code |
|---|---|---|
| SY0 | 0010010000001000000000000010001 | 1001001001000000000000000010001 |
| SY1 | 0000100010001000000000000010001 | 1000010000010000000000000010001 |
| SY2 | 0001000010001000000000000010001 | 1001000000010000000000000010001 |
| SY3 | 0000100010001000000000000010001 | 1000010000010000000000000010001 |
| SY4 | 0010001000001000000000000010001 | 1000100000010000000000000010001 |
| SY5 | 0010001000001000000000000010001 | 1000010000100000000000000010001 |
| SY6 | 0010010000001000000000000010001 | 1000000010000000000000000010001 |
| SY7 | 0010010000001000000000000010001 | 1000000010000000000000000010001 |

◄ State information bit

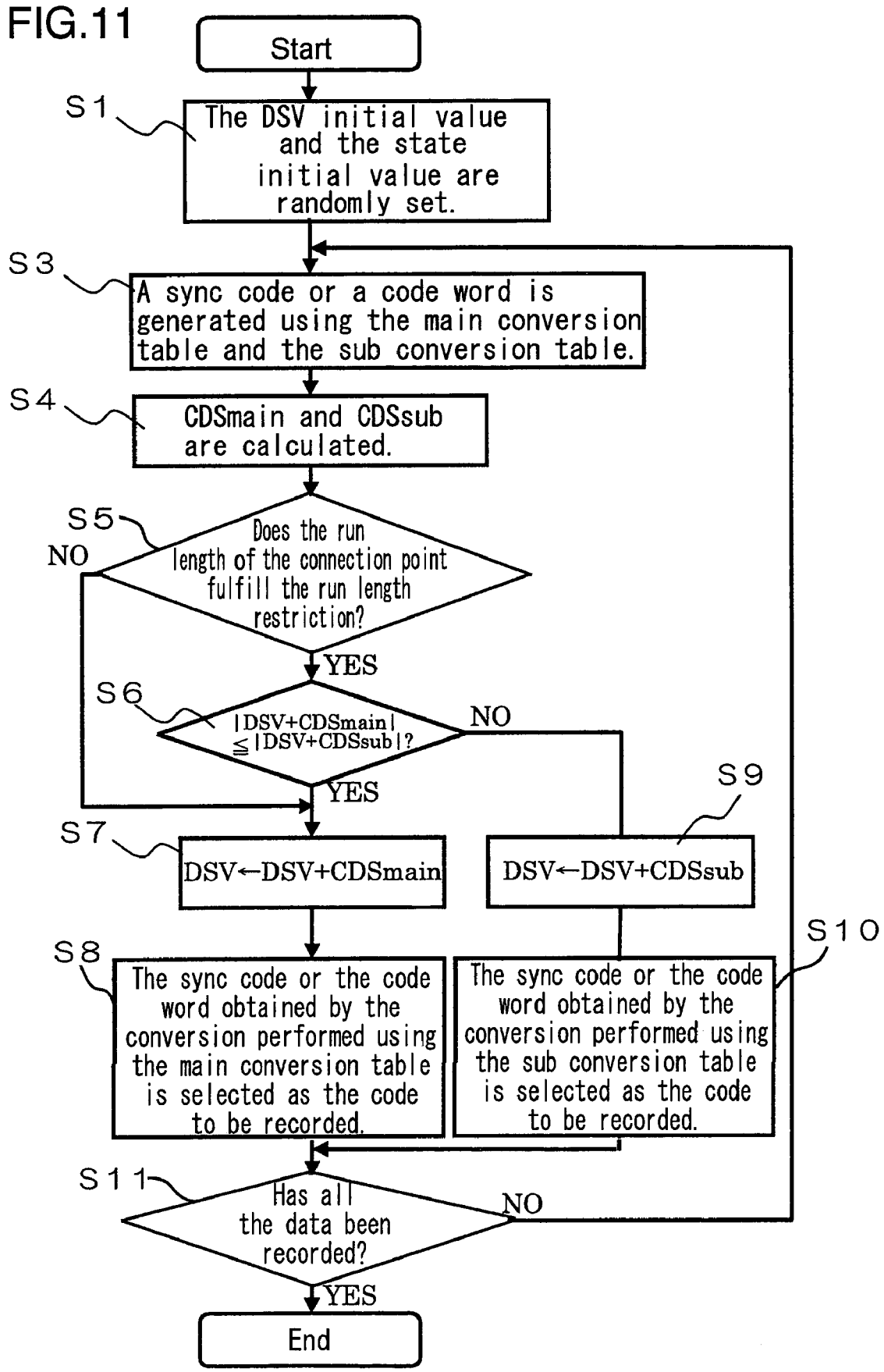

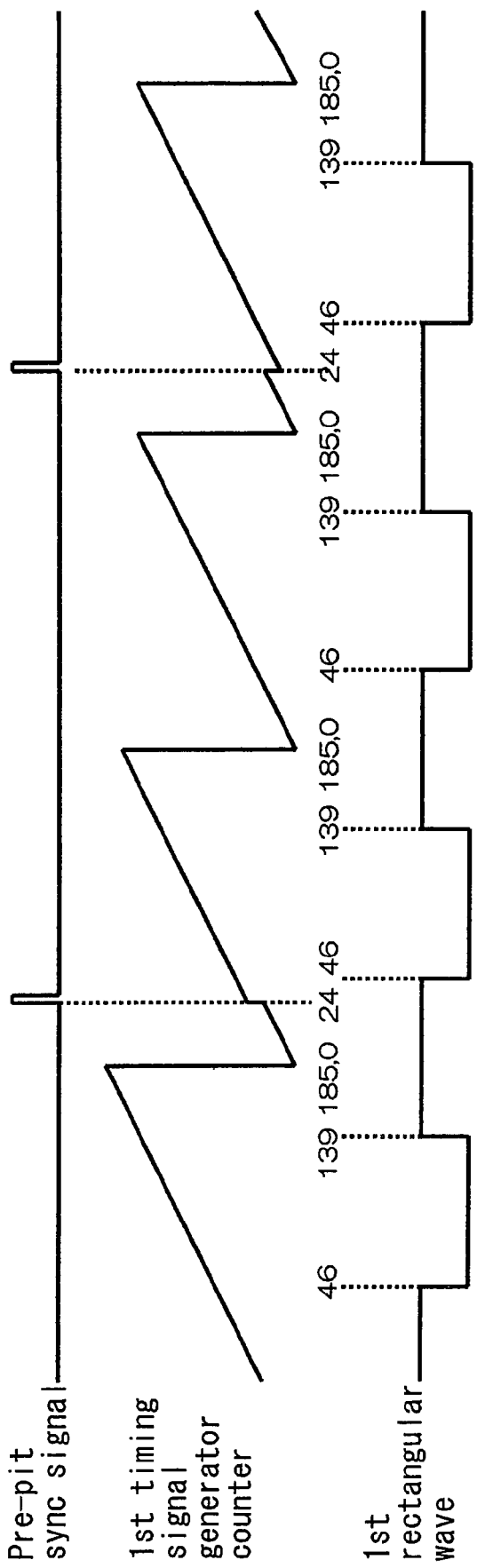

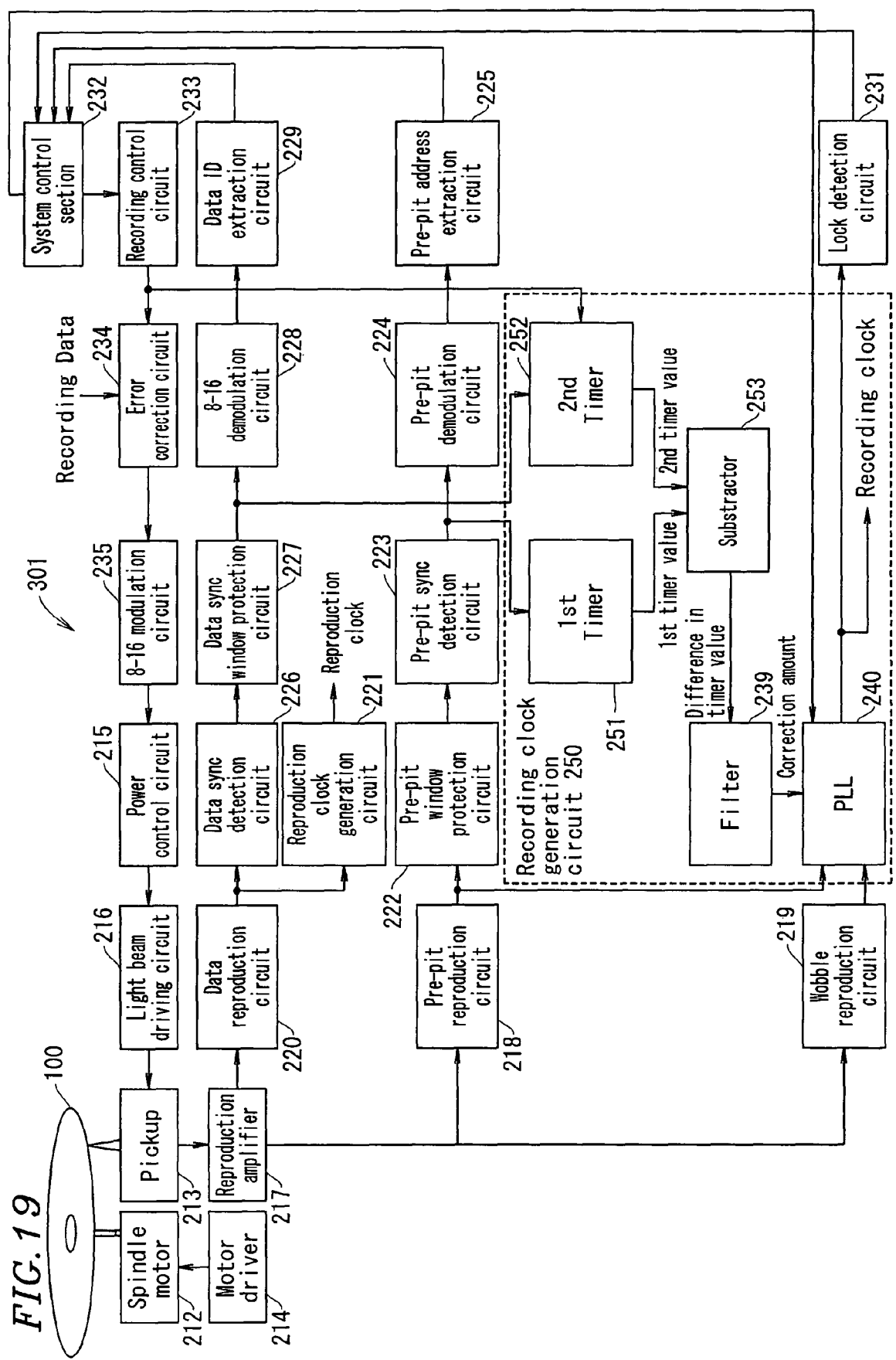

RECORDING APPARATUS AND RECORDING METHOD FOR RECORDING DATA TO A REWRITABLE RECORDING MEDIUM, AND REWRITABLE RECORDING MEDIUM

BACKGROUND OF THE INVENTION

1. Field of the Invention

The present invention relates to a recording apparatus and a recording method for recording data to a rewritable recording medium, and a rewritable recording medium.

2. Description of the Related Art

Recently, various types of digital recording mediums have been developed. Conventional digital recording mediums include, for example, rewritable optical discs such as DVD-RW discs. DVD-RW discs usually allow data to be rewritten about 1000 times, and are used for recording video and audio and data for computer use.

DVD-RW discs adopt $8/16$ modulation as a modulation rule for recording data. According to the $8/16$ modulation, an 8-bit data symbol is converted into a 16-bit code word. There are a plurality of code words usable for one data symbol. In consideration of state information and a DSV (Digital Sum Value), it is determined which one of the plurality of code words is to be selected.

The DSV is obtained as follows. Each selected code word is converted by an NRZI (Non Return to Zero Inverted) system. Based on the resultant code, a CDS (Code Word Digital Sum) is obtained for each selected code word. The CDS's are added together to obtained the DSV.

The code word is selected also in consideration of the DSV of a code word subsequent to the code word which is now to be selected (current code word).

Demodulation is performed by converting the current code word (16 bits) into an 8-bit data symbol, referring to state information (2-bits) represented by the code word immediately subsequent to the current code word. For starting recording of data, the initial value of the state information is set to a prescribed fixed value, and the initial value of the DSV is set to 0.

The above-described technology has the following inconvenience. When the same data is recorded at the same position of an optical disc repeatedly, marks of the same pattern are recorded at the same position of the optical disc. Then, a portion of a recording thin film of the optical disc is melted and solidified a plurality of times by the marks being recorded, and another portion thereof is not melted or solidified by no mark being recorded. At a border area between the portion which is melted and solidified a plurality of times and the portion which is not melted or solidified, the recording thin film is likely to have defects. As a result of such defects being spread forward and rearward from the marks, the quality of a reproduction signal is deteriorated and thus the number of rewritable times of the optical disc decreases.

SUMMARY OF THE INVENTION

According to one aspect of the invention, a recording apparatus for recording modulated data on a rewritable recording medium includes a data modulation section for modulating data in accordance with a prescribed modulation rule; a parameter value changing section for changing at least one parameter value of the prescribed modulation rule; and a recording section for recording the data modulated in accordance with the prescribed modulation rule on the recording medium.

In one embodiment of the invention, the prescribed modulation rule is a state-type modulation rule, and the at least one parameter value is an initial value of a state.

In one embodiment of the invention, the prescribed modulation rule uses a digital sum value, and the at least one parameter value is an initial value of the digital sum value.

In one embodiment of the invention, the parameter value changing section changes the at least one parameter value randomly.

In one embodiment of the invention, the parameter value changing section changes the at least one parameter value in a prescribed order.

In one embodiment of the invention, the recording apparatus further includes a storage section for storing a previously used parameter value, wherein the parameter value changing section randomly selects a parameter value to be set from parameter values which are different from the previously used parameter value.

According to another aspect of the invention, a recording method for recording modulated data on a rewritable recording medium includes the steps of modulating data in accordance with a prescribed modulation rule; changing at least one parameter value of the prescribed modulation rule; and recording the data modulated in accordance with the prescribed modulation rule on the recording medium.

According to still another aspect of the invention, a rewritable recording medium having modulated data recorded thereon is provided. The modulated data is obtained by modulating data in accordance with a prescribed modulation rule, and at least one parameter value of the prescribed modulation rule is changeable.

According to still another aspect of the invention, a recording apparatus for starting to record data based on a termination position of data which has been recorded on a rewritable recording medium is provided. The recording apparatus includes a parameter value changing section for changing a parameter value representing a target value of an offset amount of a data recording position from a prescribed reference position; an offset amount changing section for changing the offset amount of the data recording position from the prescribed reference position such that as data recording proceeds, the offset amount of the data recording position from the prescribed reference position approaches the target value; and a recording section for recording the data on the recording medium at the data recording position.

In one embodiment of the invention, the parameter value changing section changes the parameter value randomly.

In one embodiment of the invention, the parameter value changing section changes the parameter value in a prescribed order.

In one embodiment of the invention, the recording apparatus further includes a storage section for storing a previously used parameter value, wherein the parameter value changing section randomly selects a parameter value to be set from parameter values which are different from the previously used parameter value.

According to still another aspect of the invention, a recording method for starting to record data based on a termination position of data which has been recorded on a rewritable recording medium is provided. The recording method includes the steps of changing a parameter value representing a target value of an offset amount of a data recording position from a prescribed reference position; changing the offset amount of the data recording position from the prescribed reference position such that as data recording proceeds, the offset amount of the data recording position from a prescribed reference position approaches the target value; and recording the data on the recording medium at the data recording position.

According to still another aspect of the invention, a rewritable recording medium having data recorded thereon is provided. A recording start position of data is determined based on a termination position of data which has been recorded thereon. A recording position of the data is determined such that as data recording proceeds, an offset amount of the data recording position from a prescribed reference position approaches a target value. A parameter value representing the target value is changeable.

Thus, the invention described herein makes possible the advantages of providing a recording apparatus, a recording method and a recording medium for suppressing the decrease in the number of rewritable times of an optical disc even when the same data is recorded at the same position repeatedly.

These and other advantages of the present invention will become apparent to those skilled in the art upon reading and understanding the following detailed description with reference to the accompanying figures.

BRIEF DESCRIPTION OF THE DRAWINGS

FIG. 1 shows a structure of an optical disc conforming to the DVD-RW Standards;

FIG. 2 shows an LPP code conversion table;

FIG. 3 shows a table illustrating a structure of LPP information;

FIG. 9A shows an example of a main conversion table;

FIG. 9B shows an example of a sub conversion table;

FIG. 10A shows an example of a table showing the correspondence between the frame number and the sync number;

FIG. 10B shows an example of a main conversion table;

FIG. 10C shows an example of a sub conversion table;

FIG. 11 is a flowchart illustrating the 8/16 modulation processing performed by the optical disc apparatus 101 shown in FIG. 7;

FIG. 17A is a timing diagram illustrating an operation of a first timing signal generator 236 shown in FIG. 13;

FIG. 19 is a block diagram illustrating a structure of an optical disc apparatus 301 according a third example of the present invention.

DESCRIPTION OF THE PREFERRED EMBODIMENTS

Figure 4:
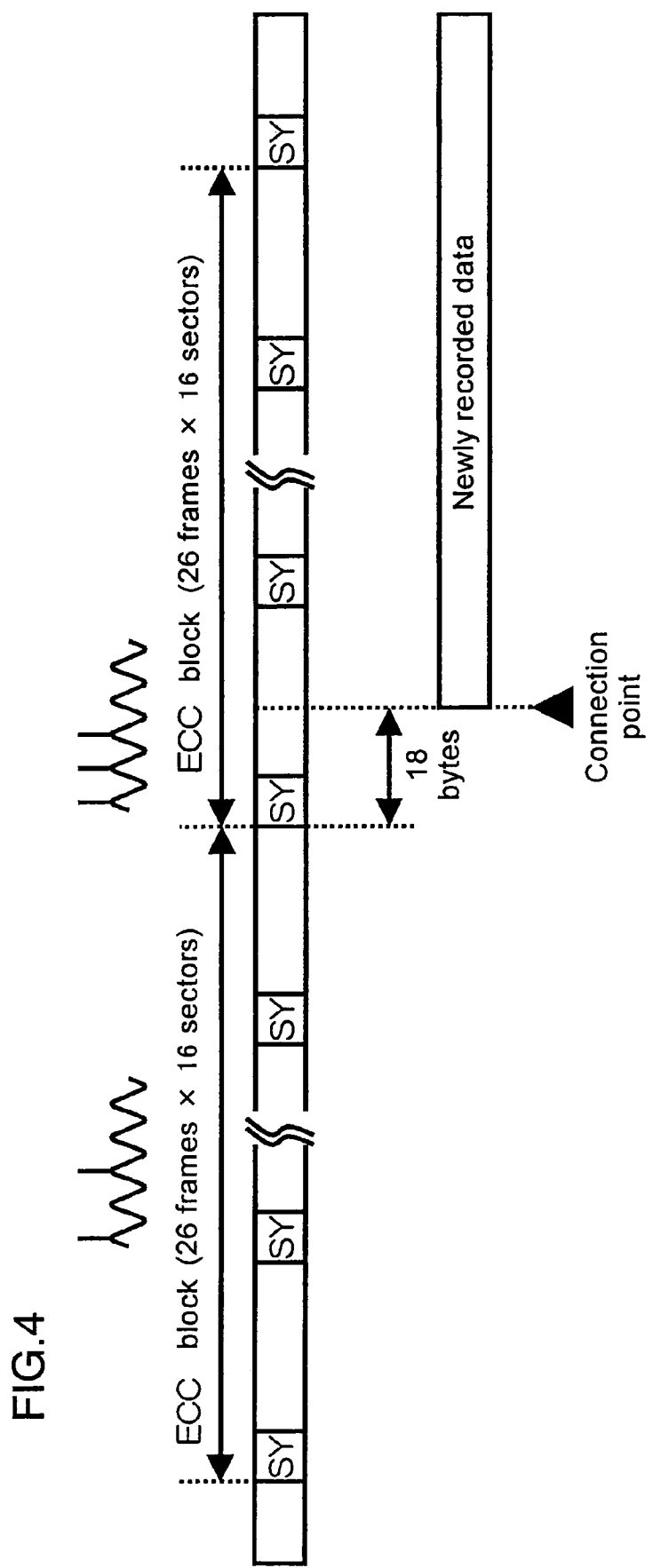
FIG. 4 is a timing diagram illustrating a linking operation.

Hereinafter, the present invention will be described by way of illustrative examples with reference to the accompanying drawings.

EXAMPLE 1

As an exemplary optical disc on and from which data is to be recorded and reproduced by an optical disc apparatus according to a first example of the present invention, a disc conforming to the DVD-RW (Digital Versatile Disc-Rewritable) Standards will be described. First, DVD-RW will be described.

(DVD-RW)

FIG. 1 shows a structure of an optical disc conforming to the DVD-RW Standards. This optical disc has a spiral recording groove (groove track). Data is recorded on the optical disc by directing a light beam to the groove track so as to change the optical characteristics of a recording film formed of a phase change material or the like to form a recording mark.

Data to be recorded is formed of an ECC (Error Correction Code) block, which is the minimum unit for error correction. An ECC block includes 16 sectors, and each sector includes 26 frames. Each frame includes a code obtained by performing the 8/16 modulation of a 2-byte synchronous signal and 91-byte data (i.e., a code of 1448T in total, which is the sum of a 32T sync section (SY) and a 1456T data section (DATA)). Here, "1T" represents a unit time length of a recording mark, and corresponds to 38.2 ns (1/(26.16 MHz)) at the standard speed of the DVD-RW.

The sync section includes a code including "a recording mark having a length of 14T and a space having a length of 4T (an area sandwiched between two recording marks) or "a space having a length of 14T and a recording having a length of 4T". A leading frame (frame 0) of each sector includes 4-byte address information referred to as a "data ID", and a 2-byte ID error detection code referred to as an "IED" (ID Error Detection Code). The groove track has wobbles at a prescribed frequency. The frequency of the wobbles is about 140.6 kHz at the standard speed. A clock signal having a unit time length of the recording mark can be obtained by multiplying the frequency of the wobbles by 186 (140.6 kHz×186=26.16 MHz). Namely, 1 wobble has a length of 186T, and 1 frame (1488T) includes 8 wobbles.

The optical disc has a pit referred to as a "land pre-pit" (LPP) formed during the production process. The land pre-pit is concaved from the surface irradiated with light and is provided in a land track sandwiched by two groove tracks. The land pre-pit represents a reference position for recording and physical address information. The land pre-pit is associated with the groove track immediately inside that groove track, and is positioned at the vertex of a wobble.

Among the 26 frames included in one sector, even numbered frames are referred to as "EVEN frames", and odd numbered frames are referred to as "ODD frames". Frame 0 is referred to as an "EVEN sync frame", and frame 1 is referred to as an "ODD sync frame". Basically, a 3-bit LPP code is located at the vertexes of the first 3 wobbles, among the 8 wobbles included in each EVEN frame.

FIG. 2 shows the meaning of LPP codes (LPP code conversion table). Where the LPP code immediately inside a given groove track and the LPP code immediately outside that given groove track are overlapping in a radial direction, the LPP code immediately outside the groove track is shifted to the ODD frame in order to prevent crosstalk from occurring between the two LPP codes. 13 LPP codes are defined for one sector. Thus, a 1-bit sync code and 12-bit LPP information can be obtained for one sector by performing reverse conversion using Table 2.

FIG. 3 shows a structure of LPP information. One piece of LPP information includes one ECC block (16 sectors). Among the 12-bit LPP information obtained for each sector, the first 4 bits (bit 1 through bit 4) are referred to as "RA" (Relative Address) and represent sector numbers in the ECC block. The remaining 8 bits (bit 5 through bit 12) are referred to as "DATA" and represent 2 pairs of error correction codes (parities) and 2 pairs of physical address information (address of the ECC block).

Figure 5A:
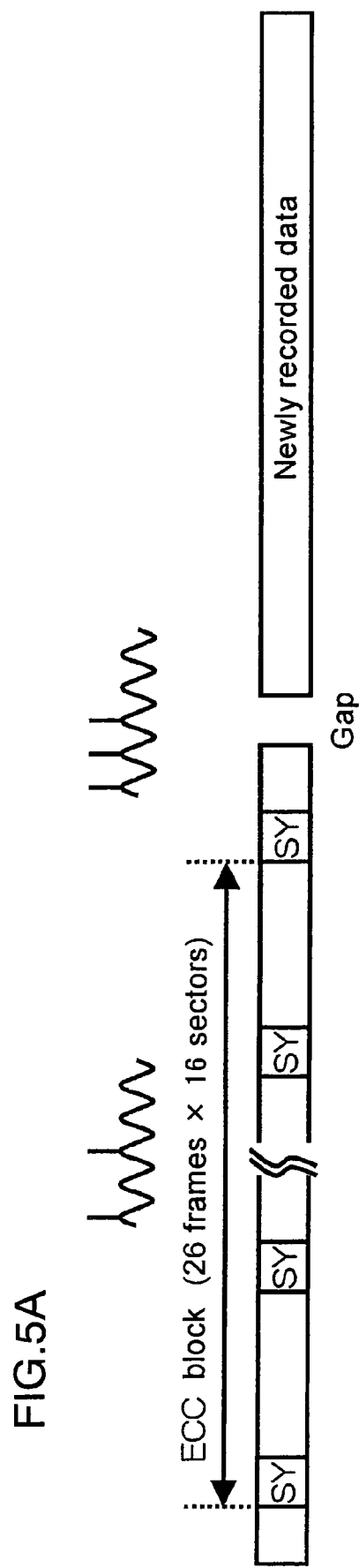
FIG. 5A shows an example of a data discontinuity as a result of a gap being generated between previously recorded data and newly recorded data.
Figure 5B:
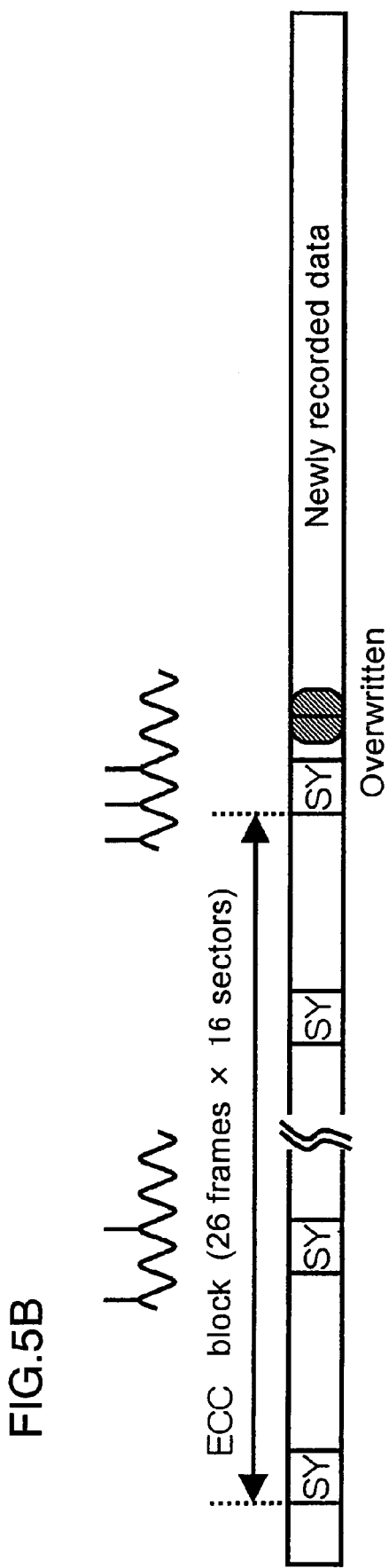
FIG. 5B shows an example of a data discontinuity as a result of previously recorded data being overwritten by newly recorded data.

FIG. 4 is a timing diagram illustrating a linking operation. For recording data to an optical disc, data is recorded at a circumferential position such that the first land pre-pits in each frame overlap a 14T long recording mark or space included in the sync section of the recording data. Recording is performed using an ECC block as the minimum unit, and is started and terminated at the 18th byte of the leading frame of the leading sector of an ECC block. "Linking" means to combine new data to be recorded with data which is previously recorded. When linking results in a failure, a data discontinuity occurs. FIG. 5A shows an example of the data discontinuity as a result of a gap being generated between previously recorded data and newly recorded data. FIG. 5B shows an example of the data discontinuity as a result of previously recorded data being overwritten by newly recorded data. In order to avoid generation of such a data discontinuity, linking is desired to be performed with high precision.

(Optical Disc Apparatus)

Figure 6:
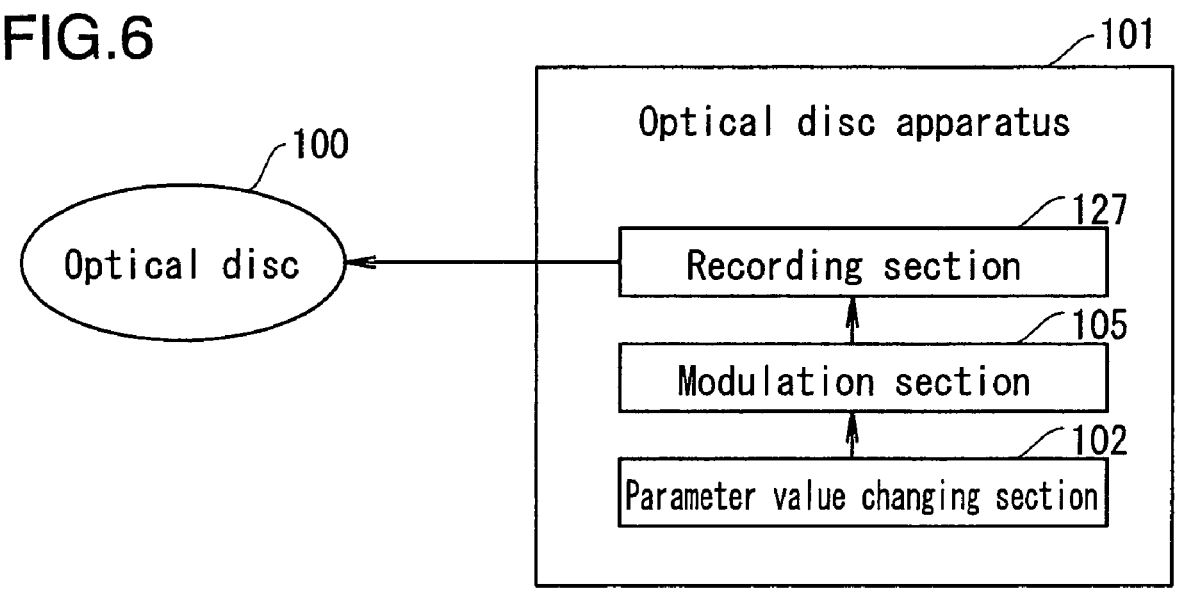
FIG. 6 is a block diagram illustrating a schematic structure of an optical disc apparatus 101 according to a first example of the present invention.

FIG. 6 is a block diagram illustrating a schematic structure of an optical disc apparatus 101 according to the first example of the present invention.

The optical disc apparatus 101 includes a modulation section 105 for modulating data in accordance with a prescribed modulation rule (for example, 8/16 modulation), a parameter value changing section 102 for changing at least one parameter value of the prescribed modulation rule, and a recording section 127 for recording data which has been modulated in accordance with the prescribed modulation rule on an optical disc 100. Thus, the optical disc apparatus 101 acts as a recording apparatus for recording modulated data on the optical disc 100.

For example, the parameter value changing section 102 changes at least one parameter value each time new data is to be recorded on the optical disc 100. The parameter value changing section 102 may change at least one parameter value randomly or in a prescribed order. Changing at least one parameter allows the same data to be converted into different modulated data. Therefore, when the same data is requested to be recorded at the same position repeatedly, different modulated data is recorded at the same position, instead of exactly the same data being recorded at the same position. As a result, the deterioration of the recording thin film of the optical disc 100 is suppressed, and thus the decrease in the number of rewritable times of the optical disc 100 can be suppressed.

As a parameter value, any value which, when changed, allows the same data to be converted into different modulated data is usable. When, for example, the prescribed modulation rule is state-type modulation, the parameter value may be the initial value of the state. Alternatively, when the prescribed modulation rule uses a DSV (Digital Sum Value), the parameter value may be the initial value of the DSV or the target value of the DSV. Still alternatively, as at least one parameter value, a combination of the initial value of the state and the initial value (or the target value) of the DSV may be used.

Now, the structure of the optical disc apparatus 101 will be described in more detail.

Figure 7:
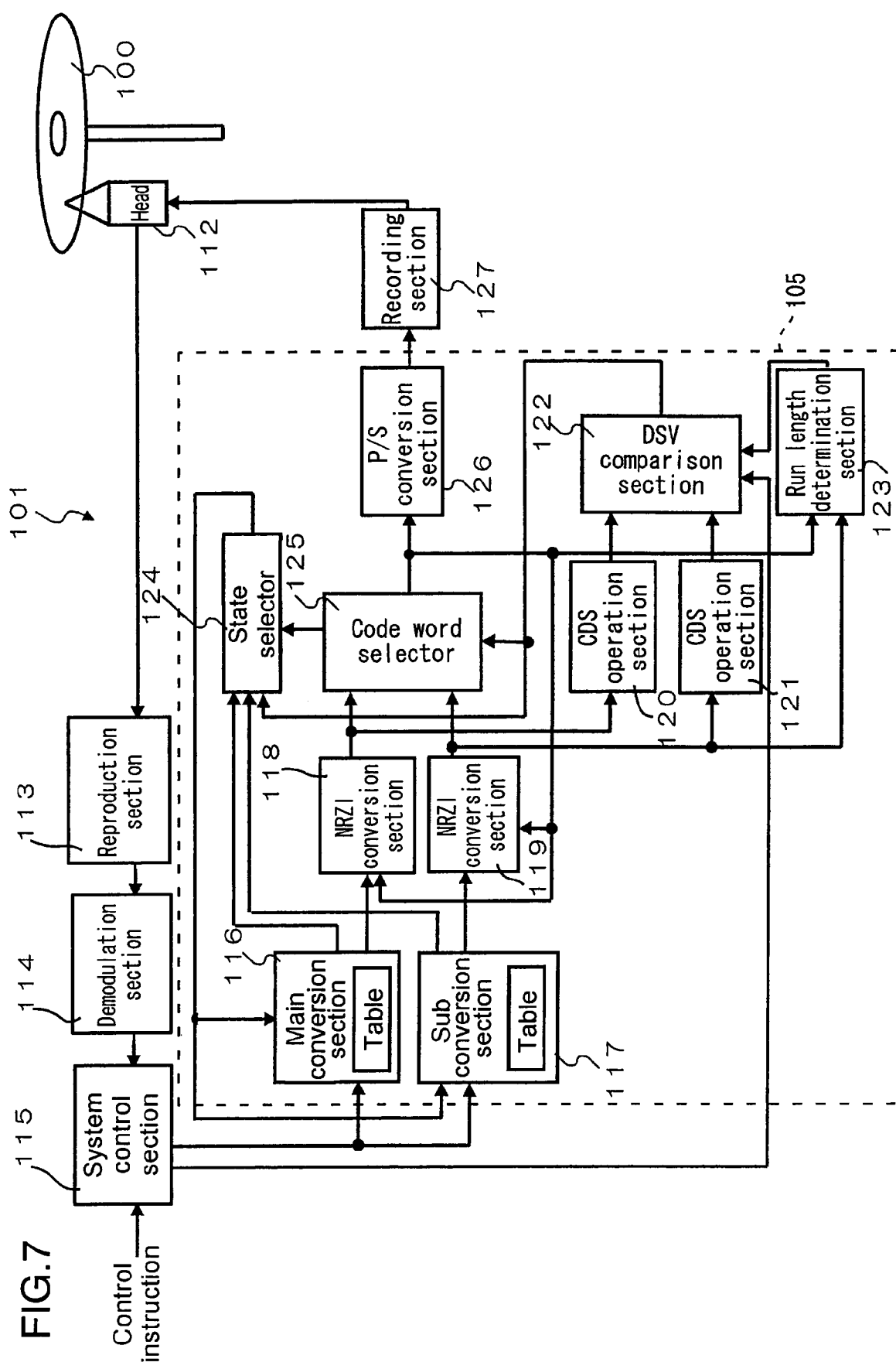
FIG. 7 is a block diagram illustrating a structure of the optical disc apparatus 101 shown in FIG. 6.

FIG. 7 is a block diagram illustrating a detailed structure of the optical disc apparatus 101.

The optical disc apparatus 101 includes a head 112, a reproduction section 113, a demodulation section 114, a system control section 115, a main conversion section 116, a sub conversion section 117, NRZI conversion sections 118 and 119, CDS operation sections 120 and 121, a DSV comparison section 122, a run length determination section 123, a state selector 124, a code word selector 125, a parallel-serial (P/S) conversion section 126, and the recording section 127.

The optical disc apparatus 101 records data having the format shown in FIG. 1 on the optical disc 100. The optical disc apparatus 101 also reproduces data recorded on the optical disc 100.

The head 112 directs a light beam to the optical disc 100 and detects light reflected by the optical disc 100, and thus outputs the data recorded on the optical disc 100 as an analog modulation signal. The reproduction section 113 performs analog-digital conversion of the analog modulation signal which is output from the head 112 so as to output a reproduction signal. The demodulation section 114 demodulates the reproduction signal which is output from the reproduction section 113 so as to output a demodulation signal. The demodulation signal is output to the system control section 115. The system control section 115 outputs a control signal for controlling data pattern generation processing (for example, a sync gate signal, a data gate signal, etc.). The sync gate signal and the data gate signal are output both to the main conversion section 116 and the sub conversion section 117.

Figure 8:
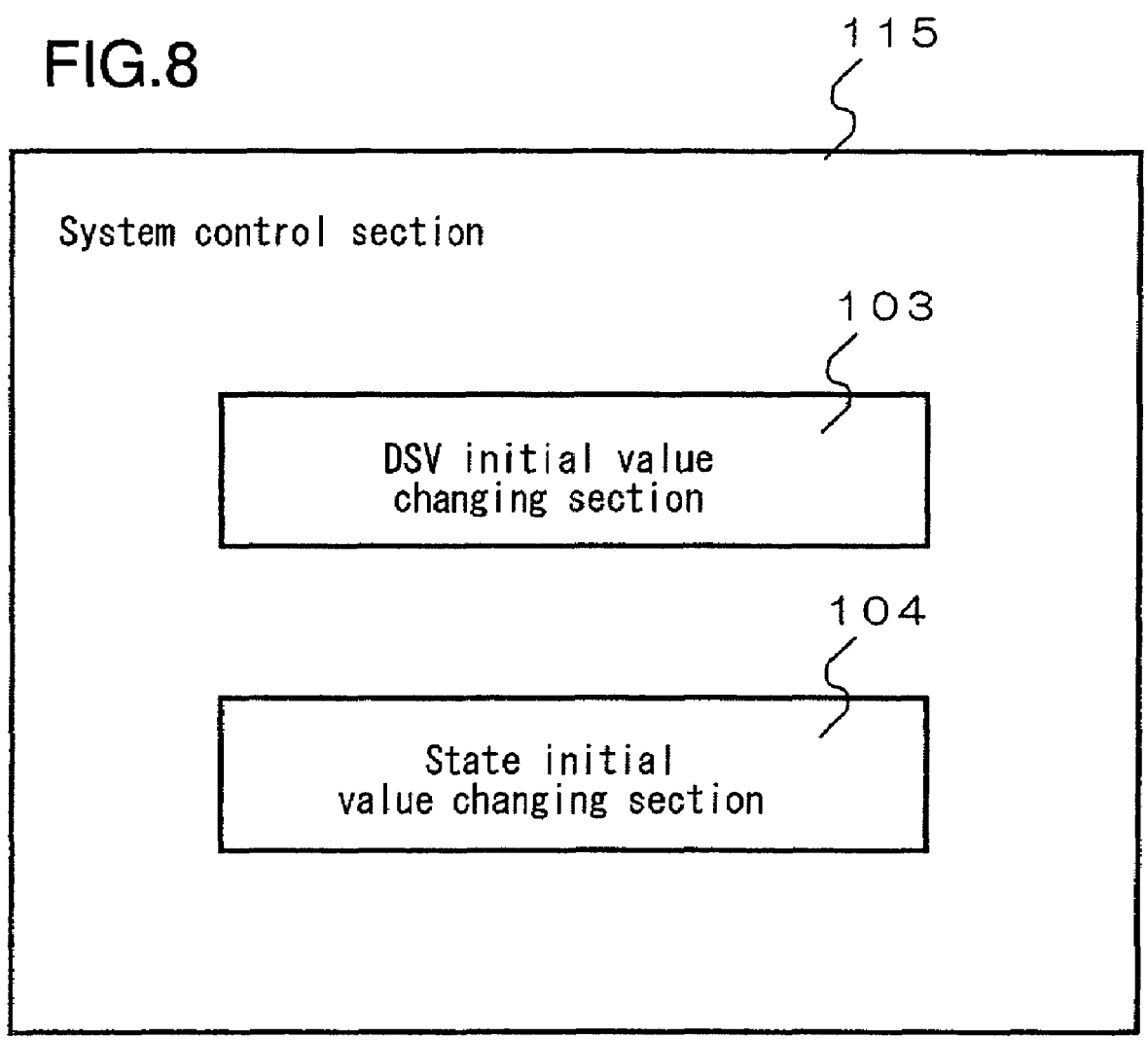
FIG. 8 is a block diagram illustrating a schematic structure of a system control section 115 of the optical disc apparatus 101 shown in FIG. 7.

FIG. 8 is a block diagram illustrating a schematic structure of the system control section 115.

The system control section 115 includes a DSV initial value changing section 103 for changing the initial value of a DSV, and a state initial value changing section 104 for changing the initial value of a state. For example, the DSV initial value changing section 103 may set the initial value of the DSV randomly each time new data is to be recorded on the optical disc 100. The DSV initial value changing section 103 may randomly select one value from prescribed number of candidate values including, for example, 0, 1, and −1, or may calculate the initial value of the DSV in accordance with a prescribed calculation equation. The state initial value changing section 104 may select one of a plurality of states randomly each time new data is to be recorded on the optical disc 100.

Returning to FIG. 7, the main conversion section 116 and the sub conversion section 117 will be described.

The main conversion section 116 has a plurality of conversion tables therein. The plurality of tables include a main conversion table shown in FIG. 9A and a main conversion table shown in FIG. 10B.

The sub conversion section 117 has a plurality of conversion tables therein. The plurality of tables include a sub conversion table shown in FIG. 9B and a sub conversion table shown in FIG. 10C.

When a sync gate signal which is output from the system control section 115 is "enable", the main conversion section 116 uses the main conversion table shown in FIG. 10B to convert the sync number into a sync code, and the sub conversion section 117 uses the sub conversion table shown in FIG. 10C to convert the sync number into a sync code.

When a data gate signal which is output from the system control section 115 is "enable", the main conversion section 116 uses the main conversion table shown in FIG. 9A to convert the data symbol into a code word and a next state code, and the sub conversion section 117 uses the sub conversion table shown in FIG. 9B to convert the data symbol into a code word and a next state code.

FIG. 9A shows a structure of a main conversion table for the 8/16 modulation as an exemplary main conversion table for the data section. FIG. 9B shows a structure of a sub conversion table for the 8/16 modulation as an exemplary sub conversion table for the data section.

The main conversion table (FIG. 9A) and the sub conversion table (FIG. 9B) each include four sub tables respectively showing state 1 through state 4. The four sub tables each include a code word and a next state for each data symbol. The code word represents the code word which is to be selected when the current data symbol is converted. The next state represents the state which is to be selected when the next data symbol is converted. The next state is used for maintaining the run length restriction of the code word connection point and also used for specifying the state information bits used for demodulation.

In the 8/16 modulation, the sub conversion table is prepared only for the data symbols 0 through 87. For the data symbols 88 et seq., the sub table for state 4 of the main conversion table is used instead of the sub table for state 1 of the sub conversion table. The sub table for state 2 of the main conversion table is used instead of the sub table for state 2 of the sub conversion table. The sub table for state 3 of the main conversion table is used instead of the sub table for state 3 of the sub conversion table. The sub table for state 1 of the main conversion table is used instead of the sub table for state 4 of the sub conversion table. Accordingly, when the sub conversion table is selected, the run length restriction may not be fulfilled. Here, the "run length restriction" means the restriction on the number of bits "0" existing between a bit "1" and the next bit "1". The number of bits "0" is restricted so as to be the minimum polarity inversion interval or more but the maximum polarity inversion interval or less.

Each code word includes state information bits based on the state of the conversion table used. The state information bits are referred to for demodulating data. In the examples shown in FIGS. 9A and 9B, the 0th bit and the 12th bit of the code word correspond to the state information bits. For state 1 or state 4, the state information bits are "0,0", "0,1", "1,0" or "1,1". Namely, in this case, the state information bits are "don't care". For state 2, the state information bits are "0,0". For state 3, the state information bits are "0,1", "1,0" or "1,1".

In FIGS. 9A and 9B, the code words corresponding to the next state 1 or 4 each have only one corresponding data symbol. The tables are structured such that the data symbol can be specified without referring to the state information bits. The code words corresponding to the next state of 2 or 3 may have a plurality of corresponding data symbols. In this case, the data symbol (8 bits) is specified based on the code word (16 bits) and the state information bits (2 bits) included in the next code word. Namely, the data symbol corresponding to a given code word can be obtained by referring to the state information bits included in the next code word.

FIG. 10A shows a structure of a table illustrating the correspondence between the frame number and the sync number. FIG. 10B shows a structure of an exemplary main conversion table for the sync section. FIG. 10C shows a structure of an exemplary sub conversion table for the sync section.

The sync code is selected using the sync number which is specified for each frame number shown in FIG. 10A. The main conversion table (FIG. 10B) and the sub conversion table (FIG. 10C) each include a sub table showing state 1/state 2, and a sub table showing state 3/state 4. Namely, state 1 and state 2 use the same sub table. Similarly, state 3 and state 4 use the same sub table. The state of the next code word of the sync section (i.e., the next state) is always 1.

Each sync code includes state information bits. The state information bits are referred to for demodulating data. In the examples shown in FIGS. 10B and 10C, the 0th bit and the 12th bit of the sync code correspond to the state information bits. For state 1 or state 2, the state information bits are "0,0". For state 3 or state 4, the state information bits are "1,0". The relationship between the state and the state information bits of the sync section is the same as the relationship between the state and the state information bits of the data section.

Thus, the optical disc apparatus 101 is structured so as to be able to change the initial value of the state. Therefore, each time a new data symbol is to be recorded on the optical disc 100, the manner of state transition can be changed. As a result, even when the same data is required to be recorded at the same position of the optical disc 100, the data can be recorded with different recording patterns at the same position.

Returning to FIG. 7, the optical disc apparatus 101 will be further described. In the following description, the sync code and the code word which are output from the main conversion section 116 will both be referred to as the "main conversion code", and the next state which is output from the main conversion section 116 will be referred to as the "main conversion state", for the sake of convenience. Similarly, the sync code and the code word which are output from the sub conversion section 117 will both be referred to as the "sub conversion code", and the next state which is output from the sub conversion section 117 will be referred to as the "sub conversion state", for the sake of convenience.

The NRZI conversion section 118 performs NRZI conversion of the main conversion code. The NRZI conversion section 119 performs NRZI conversion of the sub conversion code.

The CDS operation section 120 calculates a CDS based on the output from the NRZI conversion section 118, and outputs the calculation result a $CDS_{main}$. The CDS operation section 121 calculates a CDS based on the output from the NRZI conversion section 119, and outputs the calculation result a $CDS_{sub}$.

The run length determination section 123 determines whether or not the run length of the data connection point fulfills the run length restriction of the minimum polarity inversion interval of 10 bits, based on the output from the NRZI conversion section 119 and the output from the code word selector 125. When the run length is determined to fulfill the run length restriction, the run length determination section 123 outputs "H" (high level signal). When the run length is determined not to fulfill the run length restriction, the run length determination section 123 outputs "L" (low level signal).

The DSV comparison section 122 sets the current sum of the DSVs as $DSV_{total}$. When the output from the run length determination section 123 is "L", the DSV comparison section 122 outputs "L" and also substitutes ($DSV_{total}$+$CDS_{main}$) into $DSV_{total}$. When the output from the run length determination section 123 is "H", the DSV comparison section 122 outputs "L" and also substitutes ($DSV_{total}$+$CDS_{main}$) into $DSV_{total}$ only when the absolute value of the ($DSV_{total}$+$CDS_{main}$) is equal to or less than the absolute value of ($DSV_{total}$+$CDS_{sub}$). Otherwise, the DSV comparison section 122 outputs "H" and also substitutes ($DSV_{total}$+$CDS_{sub}$) into $DSV_{total}$. The value of $DSV_{total}$ is reset by the DSV initial value changing section 103. The value of $DSV_{total}$ is reset when, for example, new data is to be recorded on the optical disc 100. The value of $DSV_{total}$ is reset to, for example, a random value.

Thus, the optical disc apparatus 101 is structured so as to be able to change the initial value of the DSV (to which $DSV_{total}$ is reset). Therefore, each time a new data symbol is to be recorded on the optical disc 100, the manner of selecting the main conversion table and the sub conversion table can be changed. As a result, even when the same data is required to be recorded at the same position of the optical disc 100, the data can be recorded with different recording patterns at the same position. However, when the absolute value of the initial value of the DSV is excessively large, only the same recording pattern is selected for the same data symbol, since DSV control acts to decrease the absolute value of the DSV. Therefore, the initial value of the DSV is preferably within the range of ±4 (−4 or greater but +4 or less).

When the output from the DSV comparison section 122 is "L", the state selector 124 outputs the main conversion state as the next state. When the output from the DSV comparison section 122 is "H", the state selector 124 outputs the sub conversion state as the next state. The next state which is output from the state selector 124 is input to each of the main conversion section 116 and the sub conversion section 117, and is used for selecting the next conversion table.

When the output from the DSV comparison section 122 is "L", the code word selector 125 selectively outputs the output from the NRZI conversion section 118. When the output from the DSV comparison section 122 is "H", the code word selector 125 selectively outputs the output from the NRZI conversion section 119.

Namely, the code word selector 125 outputs a sync code or a code word which is converted by the conversion table which provides a smaller absolute value of the DSV. Thus, the DC component of the NRZI signal can be suppressed.

The parallel-serial conversion section 126 converts parallel data from the code word selector 125 into serial data, and outputs the serial data to the recording section 127. The recording section 127 generates an optical conversion signal corresponding to the serial data which is output from the parallel-serial conversion section 126, and records the optical conversion signal via the head 112 on the optical disc 100.

As can be appreciated from the above, the main conversion section 116, the sub conversion section 117, the NRZI conversion sections 118 and 119, the CDS operation sections 120 and 121, the DSV comparison section 122, the run length determination section 123, the state selector 124, the code word selector 125, and the parallel-serial (P/S) conversion section 126 act together as a modulation section 105 (FIG. 6) for modulating data in accordance with a prescribed modulation rule (for example, 8/16 modulation). The system control section 115 acts as the parameter value changing section 102 (FIG. 6) for changing at least one parameter value of the prescribed modulation rule.

Next, an operation of the optical disc apparatus 101 will be described with reference to a flowchart. In the 8/16 modulation of the data section and the sync section, the main conversion table and the sub conversion table are appropriately used such that the value of the DSV is a prescribed value.

FIG. 11 is a flowchart illustrating the operation of the optical disc apparatus 101 for the 8/16 modulation. First, the initial value of the DSV and the initial value of the state are randomly set (step S1). Thus, even when the same data is recorded repeatedly at the same position, the data can be recorded with different recording patterns at the same position and thus the decrease in the number of rewritable times can be suppressed.

Next, a sync code to be recorded in the sync section or a code word to be recorded in the data section is generated using the main conversion table and the sub conversion table (step S3). Specifically, for recording a sync code in the sync section, the main conversion table shown in FIG. 10B and the sub conversion table shown in FIG. 10C are used to convert the sync number corresponding to the frame number shown in FIG. 10A into a sync code. For recording a code word in the data section, the main conversion table shown in FIG. 9A and the sub conversion table shown in FIG. 9B are used to convert the data symbol into a code word.

In either case, the state is to be used is determined based on the next state which is determined at the immediately previous conversion.

In step S4, the sync code or the code word obtained by the conversion performed using the main conversion table is further processed by the NRZI conversion. A CDS is calculated based on the result of the NRZI conversion. The result is output as the $CDS_{main}$. The sync code or the code word obtained by the conversion performed using the sub conversion table is further processed by the NRZI conversion. The CDS is calculated based on the result of the NRZI conversion. The result is output as the $CDS_{sub}$.

In step S5, the run length of the connection point, in which the sync code or the code word obtained by the conversion performed using the sub conversion table is connected to the sync code or the code word previously processed is calculated, and it is determined whether or not the run length fulfills the prescribed run length restriction (step S5). When the run length is determined to fulfill the prescribed run length restriction, the processing goes to step S6. When the run length is determined not to fulfill the prescribed run length restriction, the processing goes to step S7. The reason why it is determined whether or not the run length fulfills the prescribed run length restriction only regarding the sync code or the code word obtained by the conversion performed using the sub conversion table is as follows: The run length restriction is always fulfilled by the conversion performed using the main conversion table, whereas the run length restriction sometimes is not fulfilled by the conversion performed using the sub conversion table.

When the run length restriction is determined not to be fulfilled, the conversion is performed using the main conversion table. Thus, the run length restriction for the 8/16 modulation can be fulfilled with certainty. In step S6, the absolute value of the sum of the current (latest) DSV and $CDS_{main}$ is compared with the absolute value of the sum of the current DSV and $CDS_{sub}$. When the former is equal to or less than the latter, the processing goes to step 7. When the former is greater than the latter, the processing goes to step S9.

In step S7, the sum of the current DSV and $CDS_{main}$ is newly set as a DSV. Then, the sync code or the code word obtained by the conversion performed using the main conversion table is selected as the code to be recorded (step S8).

In step S9, the sum of the current DSV and $CDS_{sub}$ is newly set as a DSV. Then, the sync code or the code word obtained by the conversion performed using the sub conversion table is selected as the code to be recorded (step S10).

As described above, it is determined whether or not all the data has been recorded (step S11). When all the data has been recorded, the processing is terminated. When all the data has not been recorded, the processing returns to step S3.

Thus, according to the first example of the present invention, each time new data is to be recorded on the optical disc, the initial value of the DSV and the initial value of the state can be randomly changed. Therefore, even when the same data needs to be recorded at the same position repeatedly, the data can be recorded with different recording patterns at the same position. As a result, the decrease in the number of rewriting times can be suppressed.

EXAMPLE 2

Figure 12:
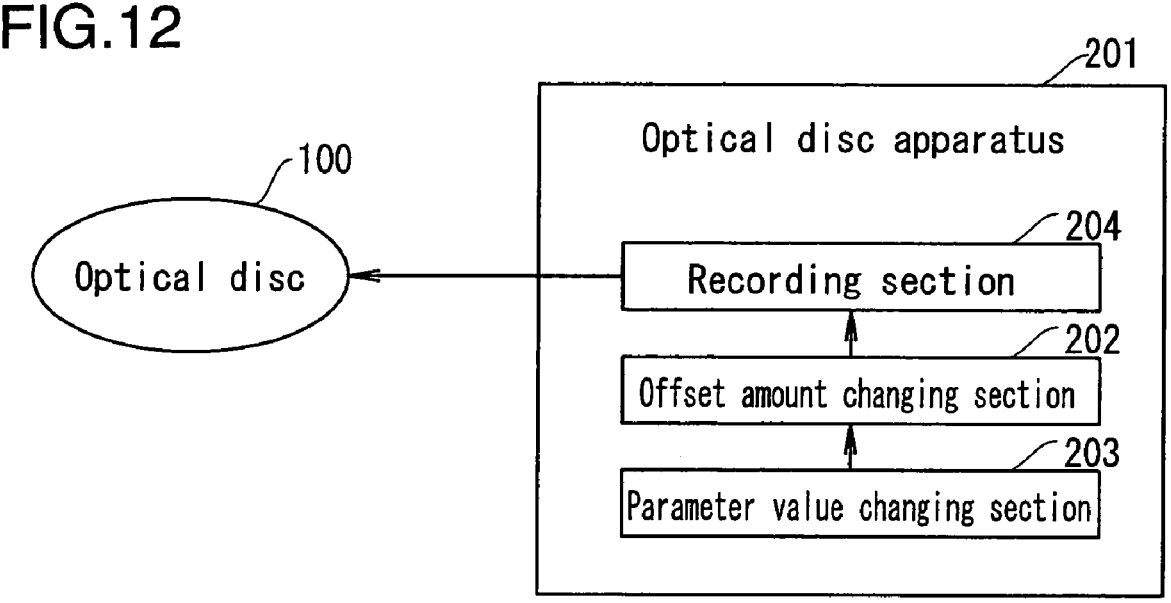
FIG. 12 is a block diagram illustrating a schematic structure of an optical disc apparatus 201 according to a second example of the present invention.

FIG. 12 is a block diagram illustrating a schematic structure of an optical disc apparatus 201 according to a second example of the present invention.

The optical disc apparatus 201 includes a parameter value changing section 203 for changing a target value of an offset amount of the data recording position with respect to a prescribed reference position, an offset amount changing section 202 for changing the offset amount of the data recording position with respect to the prescribed reference position such that the offset amount approaches the target value as the recording of data proceeds, and a recording section 204 for recording the data at the data recording position of the optical disc 100. The optical disc apparatus 201 acts as a recording apparatus for starting recording of the data based on a terminal position of data which has been recorded on the optical disc 100.

For example, the parameter value changing section 203 changes a parameter value each time new data is to be recorded on the optical disc 100. The parameter value changing section 203 may change the parameter value randomly or in a prescribed order. By changing the parameter value, the same data is allowed to be recorded at slightly different positions. Therefore, when the same data is requested to be recorded at the same position repeatedly, the data is recorded at slightly different positions, instead of the same data being recorded at exactly the same position. As a result, the deterioration of the recording thin film of the optical disc 100 is suppressed, and thus the decrease in the number of rewritable times of the optical disc 100 can be suppressed.

Now, the structure of the optical disc apparatus 201 will be described in more detail.

Figure 13:
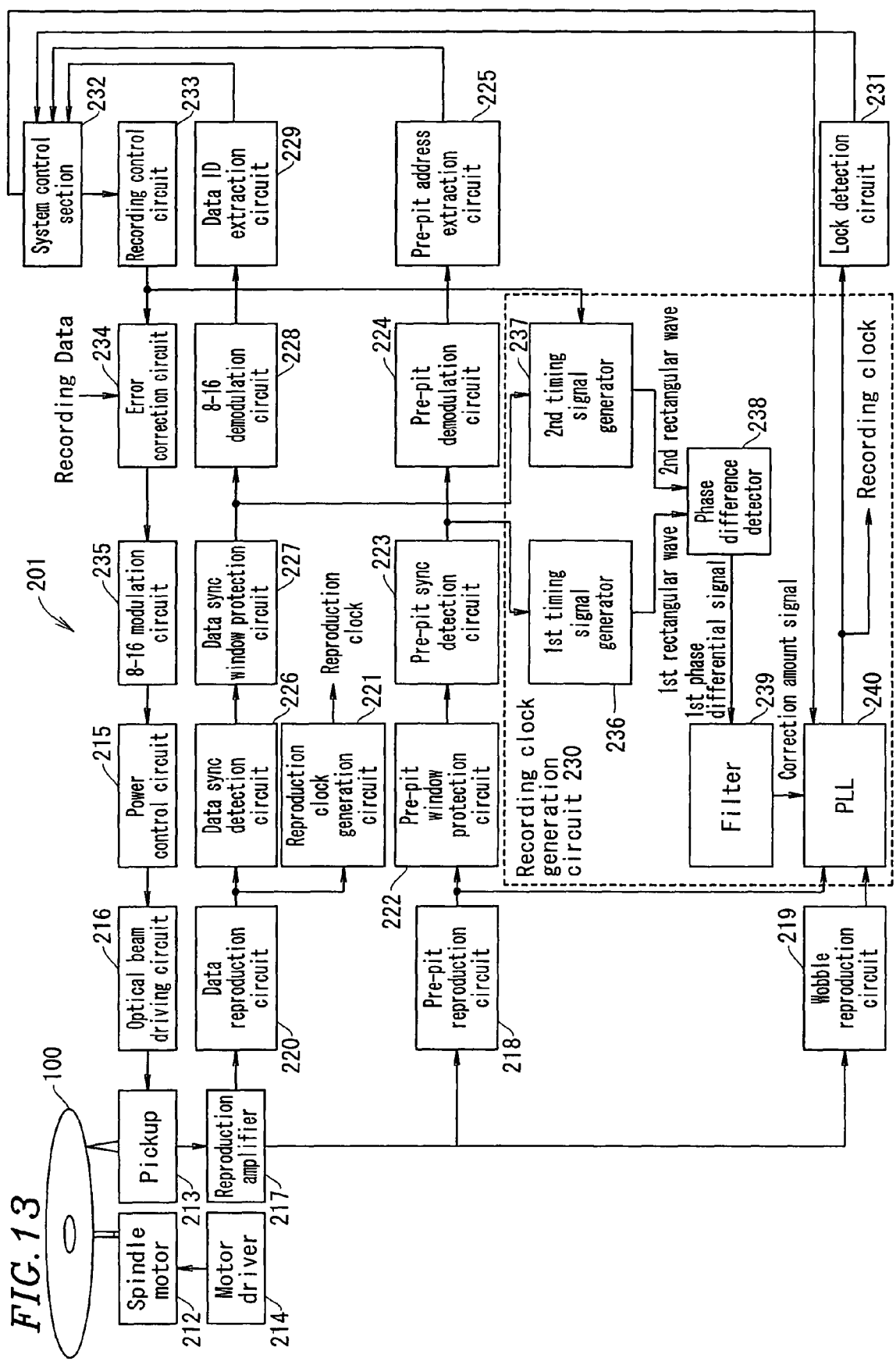
FIG. 13 is a block diagram illustrating a structure of the optical disc apparatus 201 shown in FIG. 12.

FIG. 13 is a block diagram illustrating a detailed structure of the optical disc apparatus 201.

The optical disc apparatus 201 includes a spindle motor 212, a pickup 213, a motor driver 214, a power control circuit 215, a light beam driving circuit 216, a reproduction amplifier 217, a pre-pit reproduction circuit 218, a wobble reproduction circuit 219, a data reproduction circuit 220, a reproduction clock generation circuit 221, a pre-pit window protection circuit 222, a pre-pit sync detection circuit 223, a pre-pit demodulation circuit 224, a pre-pit address extraction circuit 225, a data sync detection circuit 226, a data sync window protection circuit 227, an 8/16 demodulation circuit 228, an data ID extraction circuit 229, a recording clock generation circuit 230, a lock detection circuit 231, a system control section 232, a recording control circuit 233, an error correction circuit 234, and an 8/16 modulation circuit 235.

The spindle motor 212 rotates the optical disc 100 at a prescribed rotation frequency. The spindle motor 212 is driven by the motor driver 214.

The pickup 213 directs a light beam having a prescribed reproduction power to the optical disc 100. The light beam which is output from the pickup 213 is controlled based on a driving signal which is output from the light beam driving circuit 216. The light beam driving circuit 216 is controlled based on a reproduction power control signal which is output from the power control circuit 215. The light reflected by the optical disc 100 represents the optical characteristics and physical characteristics of a portion of a recording film of the optical disc 100 irradiated with the light beam. The light reflected by the optical disc 100 is incident on the pickup 213.

The pickup 213 includes a plurality of light receiving circuits (not shown). The plurality of light receiving circuits each convert an amount of the light reflected by the optical disc 100 into an electric signal.

The reproduction amplifier 217 generates a sum signal (RF signal or radio frequency signal) by adding the electric signals which are output from the plurality of light receiving circuits, and also generates a differential signal (push-pull signal) from an amplified RF signal and electric signals which are output from the light receiving circuits which are separated from each other along a line substantially parallel to the track of the optical disc 100. The RF signal is output to the data reproduction circuit 220. The push-pull signal is output to the pre-pit reproduction circuit 218 and the wobble reproduction circuit 219.

The pre-pit reproduction circuit 218 includes a comparator (not shown) for comparing the level of the push-pull signal with a slice level (substantially an intermediate value between (i) the maximum level of the land pre-pit and (ii) the maximum level of the waveform of the wobble). When the level of the push-pull signal is higher than the slice level, the pre-pit reproduction circuit 218 outputs an "H" level pre-pit signal. When the level of the push-pull signal is lower than the slice level, the pre-pit reproduction circuit 218 outputs an "L" level pre-pit signal.

The wobble reproduction circuit 219 includes a BPF (Band Pass Filter) for allowing the wobble frequency components (140.6 kHz and the vicinity thereof at the standard speed) to pass therethrough, and a comparator (not shown) for comparing the level of the signal output from the BPF with a slice level (substantially an intermediate value of the amplitude of the wobbles). By causing the push-pull signal to pass through the BPF, the push-pull signal can be deprived of noise components and land pre-pit components. When the level of the signal output from the BPF is higher than the slice level, the wobble reproduction circuit 219 outputs an "H" level wobble signal. When the level of the signal output from the BPF is lower than the slice level, the wobble reproduction circuit 219 outputs an "L" level wobble signal.

The data reproduction circuit 220 includes a comparator (not shown) for comparing the level of the RF signal with a slice level (the value at which the latest total of the levels of the "H" signals in a prescribed zone is substantially equal to the latest total of the levels of the "L" signals in the prescribed zone). When the level of the RF signal is higher than the slice level, the data reproduction circuit 220 outputs an "H" level data reproduction signal. When the level of the RF signal is lower than the slice level, the data reproduction circuit 220 outputs an "L" level data reproduction signal.

The reproduction clock generation circuit 221 controls the frequency of the reproduction clock, such that the shortest length of the "H" level portion or the "L" level portion of the data reproduction signal (3T) corresponds to 3 cycles of the reproduction clock and further such that the longest length of the "H" level portion or the "L" level portion of the data reproduction signal (14T) corresponds to 14 cycles of the reproduction clock. Thus, the reproduction clock generation circuit 221 generates a reproduction clock having a frequency of 1T.

The pre-pit window protection circuit 222 predicts the position of the pre-pit signal to be detected next, based on the position of the previously detected pre-pit signal, and removes pre-pit signals which are detected at the positions other than the predicted position. Thus, erroneous detection of pre-pits can be reduced.

The pre-pit sync detection circuit 223 extracts a pre-pit sync signal corresponding to the first land pre-pit of the LPP code, from the pre-pit signal which is output from the pre-pit window protection circuit 222.

The pre-pit demodulation circuit 224 is synchronized with the pre-pit sync signal and converts the pre-pit signal into pre-pit information in accordance with the table shown in FIG. 2.

The pre-pit address extraction circuit 225 is synchronized with the EVEN sync frame or the ODD sync frame of the pre-pit information, obtains RA And LPP information, stores the LPP information in a memory based on the RA, performs prescribed error correction, and extracts a pre-pit address.

The data sync detection circuit 226 synchronizes the data reproduction signals at a timing of the reproduction clock, detects a sync code including a 14T long recording mark and a 4T long space or a 14T long space and a 4T long recording mark, and outputs a data sync detection signal.

The data sync window protection circuit 227 predicts the position of the data sync detection signal to be detected next, based on the position of the previously detected data sync detection signal, and removes data sync detection signals detected at positions other than the predicted position. Thus, erroneous detection of data sync can be reduced.

The 8/16 demodulation circuit 228 performs 8/16 demodulation based on the data sync detection signal which is output from the data sync window protection circuit 227, and output the demodulated data.

The data ID extraction circuit 229 extracts a data ID from the demodulated data.

The recording clock generation circuit 230 generates a recording clock. The frequency of the recording clock is controlled by the wobble signal and the pre-pit signal. The structure of the recording clock generation circuit 230 will be described later.

The lock detection circuit 231 detects that the recording clock is stable within a prescribed frequency range, and outputs a lock signal.

The system control section 232 refers to the extracted pre-pit address or data ID for detecting the lock signal which indicates that the pickup 213 has reached the address at which the data is to be recorded and the recording clock is stabilized. When such a lock signal is detected, the system control section 232 instructs the recording control circuit 233 to start a recording operation.

Figure 14:
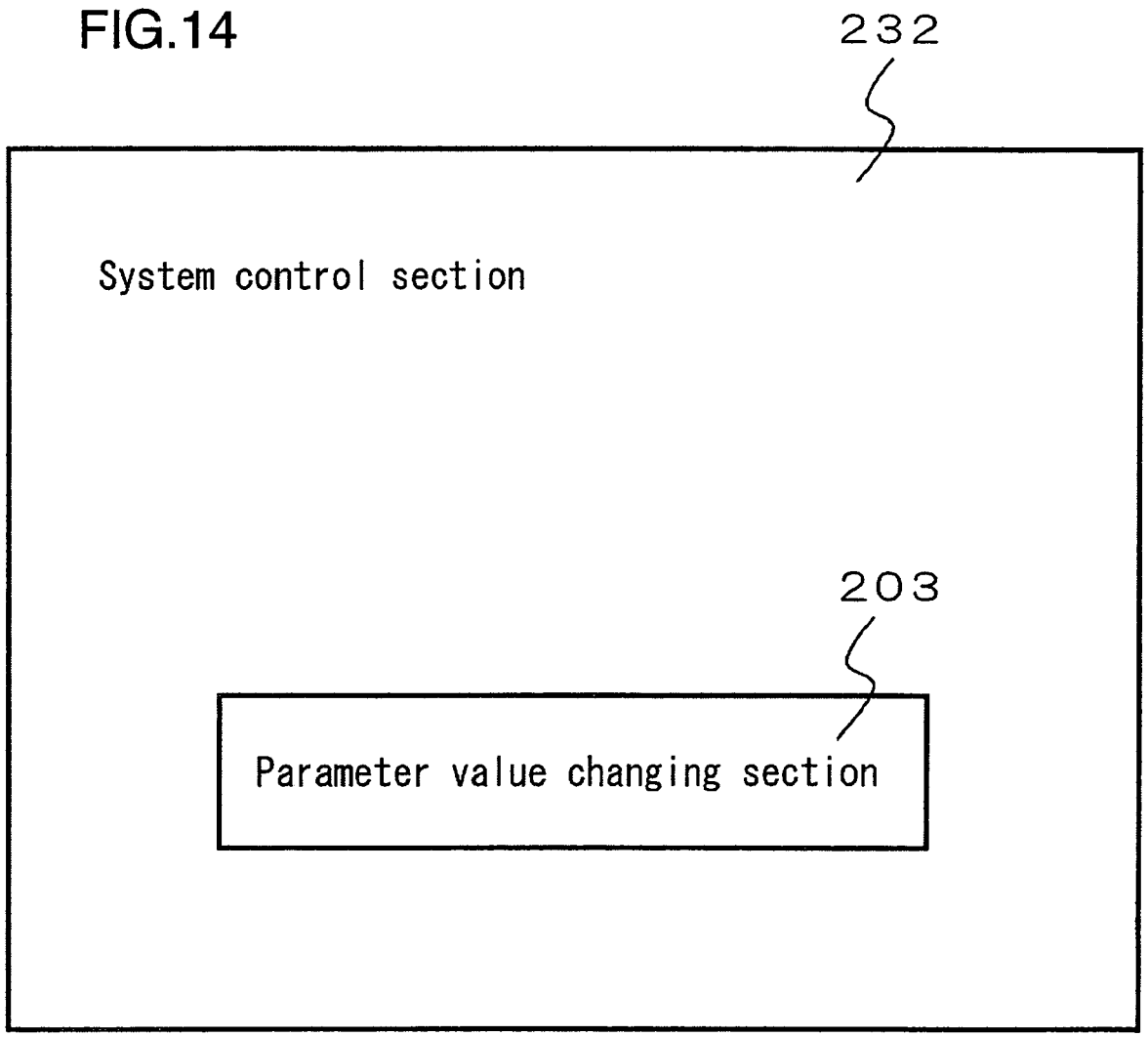
FIG. 14 is a block diagram illustrating a schematic structure of a system control section 232 of the optical disc apparatus 201 shown in FIG. 13.

FIG. 14 is a block diagram illustrating a schematic structure of the system control section 232.

The system control section 232 includes the parameter value changing section 203 for changing the target value of an offset amount of the data recording position with respect to a prescribed reference position. For example, the parameter value changing section 203 may randomly change the parameter value each time new data is to be recorded on the optical disc 100. The parameter value which is set by the parameter value changing section 203 is output to the recording clock generation circuit 230.

Returning to FIG. 13, the recording control circuit 233 determines whether or not data is recorded in a portion of the optical disc 100 immediately before the point at which recording is to be started, in response to the instruction from the system control section 232 to start the recording operation. When no data is recorded immediately before the point at which recording is to be started, the recording control circuit 233 determines a recording start point based on the pre-pit signal and generates a recording gate signal. When data is recorded immediately before the point at which recording is to be started, the recording control circuit 233 determines a recording start point based on the data sync detection signal and generates a recording gate signal.

The error correction circuit 234 adds an error correction code to the data to be recorded in response to the recording gate signal.

The 8/16 modulation circuit 235 generates a modulation signal by performing the 8/16 modulation on the output from the error correction circuit 234, synchronizes the modulation signal to the recording clock, and outputs the resultant signal.

The power control circuit 215 outputs a recording power control signal to the light beam driving circuit 216, in response to the recording gate signal.

The light beam driving circuit 216 forms the modulation signal into a multi-pulse signal based on a prescribed write strategy, and outputs a driving signal in accordance with the recording power control signal.

The pickup 213 converts the driving signal into a light beam, and directs the light beam to the recording film of the optical disc 100. The optical characteristics of the portion of the recording film irradiated with the light beam are changed. As a result, a recording mark is formed on the recording film.

The recording clock generation circuit 230 includes a first timing signal generator 236, a second timing signal generator 237, a phase difference detector 238, a filter 239, and a PLL (Phase Locked Loop) circuit 240.

The first timing signal generator 236 outputs a first rectangular wave. The first timing signal generator 236 includes a counter (not shown) for counting the number of edges of the recording clock (rising edges or falling edges) and a matching detection circuit (not shown) for outputting an "H" level signal when the count value of the counter reaches prescribed value (B) and outputting an "L" level signal when the count value of the counter reaches prescribed value (C). The count value of the counter is preset to prescribed value (A) in response to the pre-pit sync signal. When the pre-pit sync signal is not input to the first timing signal generator 236, the first timing signal generator 236 resets the count value of the counter to "0" after the count value reaches prescribed value (D). The counter is preset in response to the pre-pit sync signal regardless of whether data is recorded (the recording gate signal is output) or not (the recording gate signal is not output).

The second timing signal generator 237 outputs a second rectangular wave. The second timing signal generator 237 includes a counter (not shown) for counting the number of edges of the recording clock (rising edges or falling edges) and a matching detection circuit (not shown) for outputting an "H" level signal when the count value of the counter reaches prescribed value (B) and outputting an "L" level signal when the count value of the counter reaches prescribed value (C). The count value of the counter is preset to prescribed value (E) in response to the data sync detection signal. When the data sync detection signal is not input to the second timing signal generator 237, the second timing signal generator 237 resets the count value of the counter to 0" after the count value reaches prescribed value (D). The counter is preset in response to the data sync detection signal regardless of whether data is recorded (the recording gate signal is output) or not (the recording gate signal is not output).

Prescribed values (A) and (E) are designed such that when the land pre-pit and the center of the 14T long recording mark or space of the sync section of the data are recorded in an overlapping state, the difference between the phase of the first rectangular wave and the phase of the second rectangular wave is 0. Prescribed value (D) is a multiple of the length of one cycle of wobble.

The phase difference detector 238 operates only in the case of recording (the recording gate signal is output), and outputs a first phase differential signal indicating the difference between the phase of the first rectangular wave and the phase of the second rectangular wave.

The filter 239 outputs a correction amount signal, which is obtained by limiting the time-axis change amount of the first phase differential signal. The filter 239 is realized by using, for example, an LPF (Low Pass Filter). The time-axis change amount of the first phase differential signal is limited such that the response speed of the data reproduction PLL of an apparatus for reproducing data which has been recorded on an optical disc by the optical disc apparatus in this example can be sufficiently tracked by generation of the reproduction clock.

Usually, the response speed of the PLL is desirably 9 kHz or higher. When the rate at which the offset amount of the recording position from the recording start position is changed, namely, the rate at which the recording position is offset from the recording start position is changed, is too high, the PLL may not be able to track the time-axis change of the recording signal during the data reproduction. This results in a reproduction error. On the other hand, in order to improve the effect of preventing the same data from being written at the same position, the rate at which the offset amount of the recording position from the recording start position is changed is desirably as high as possible. Therefore, the rate at which the offset amount of the recording position is changed is desirably 9 kHz or less, which does not exceed the response speed of the reproduction PLL.

The PLL circuit 240 controls the frequency of the recording clock based on the pre-pit signal and the wobble signal. The PLL circuit 240 also controls the frequency of the recording clock such that the correction amount signal from the filter 239 (i.e., the phase difference between the first rectangular wave and the second rectangular wave) approaches the parameter value from the system control section 232.

Figure 15:
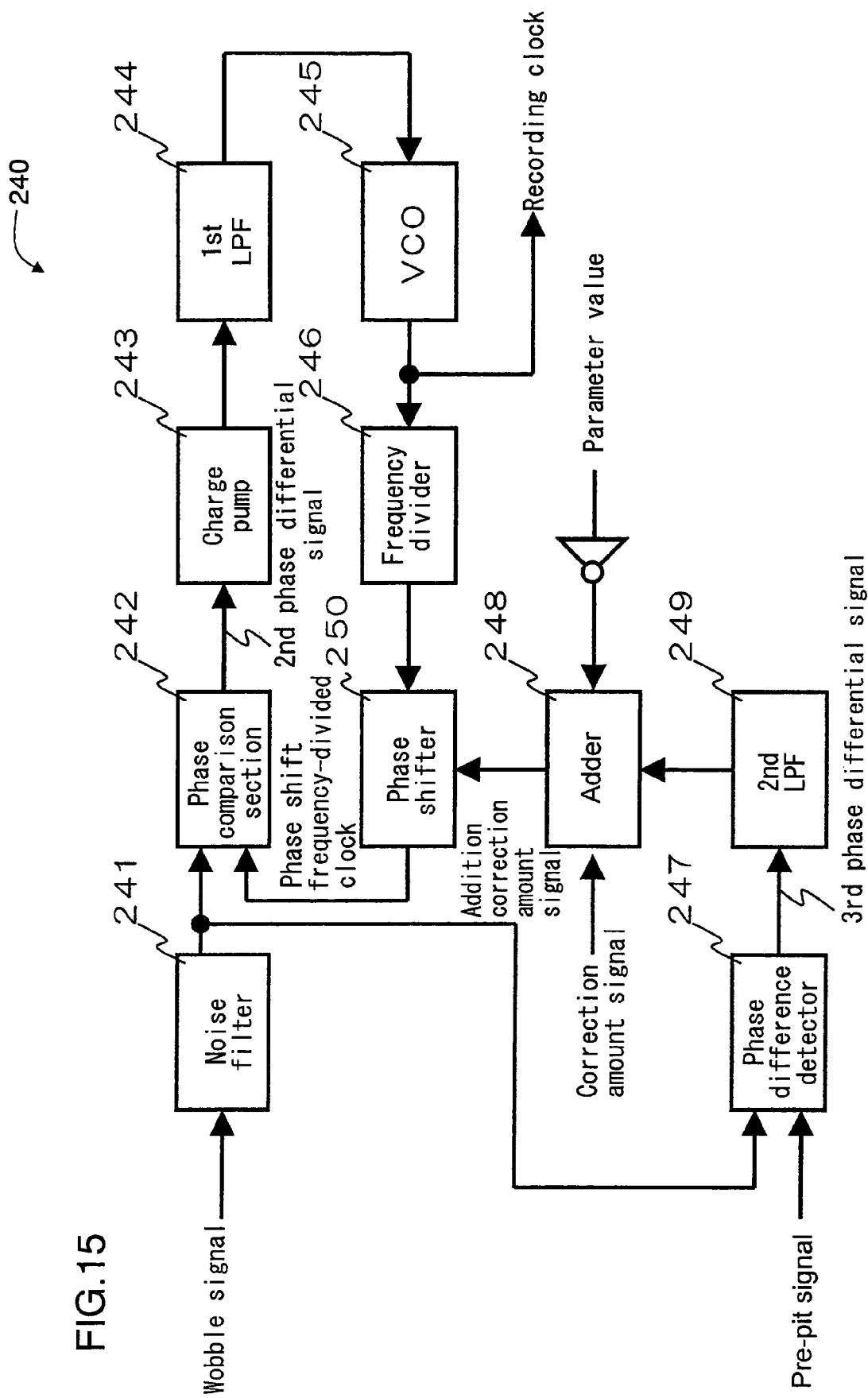
FIG. 15 is a block diagram illustrating an exemplary structure of a PLL circuit 240 of the optical disc apparatus 201 shown in FIG. 13.

FIG. 15 is a block diagram illustrating an exemplary structure of the PLL circuit 240.

The PLL circuit 240 includes, for example, a noise filter 241, a phase comparator 242, a charge pump 243, a first LPF 244, a VCO 245, a frequency divider 246, a phase difference detector 247, an adder 248, a second LPF 249, and a phase shifter 250.

The noise filter 241 removes "H" level pulses and "L" level pulses which are equal to or less than a prescribed level from wobble signals as noise.

The phase comparator 242 compares the phase of the wobble signal deprived of noise by the noise filter 241 with the phase of the phase shift frequency-divided clock which is output from the phase shifter 250, and outputs a second phase differential signal representing the result of the comparison.

The charge pump 243 converts the second phase differential signal output from the phase comparator 242 into a voltage level signal.

The first LPF 244 removes a high region component from the voltage level signal output from the charge pump 243.

The VCO 245 oscillates at the frequency in accordance with the voltage level signal deprived of the high region component by the first LPF 244, and outputs a recording clock.

The frequency divider 246 divides the frequency of the recording clock by 186 to output a frequency-divided clock.

The phase difference detector 247 detects the difference between the phase of the pre-pit signal and the phase of the wobble signal each time the pre-pit signal is input, and outputs a third phase differential signal representing the result of the detection.

The second LPF 249 removes a high region component from the third phase differential signal which is output from the phase difference detector 247, and outputs a signal which is obtained by limiting the time-axis change amount of the third phase differential signal.

The adder 248 adds the signal which is output from the second LPF 249, the correction amount signal, and the parameter value which has passed through an inverter, and generates an addition correction amount signal.

The phase shifter 250 shifts the phase of the frequency-divided clock in accordance with the addition correction amount signal, and outputs a phase shift frequency-divided clock.

As can be appreciated from the above, the system control section 232 acts as the parameter value changing section 203 (FIG. 12) for changing the parameter value which represents the target value of the offset amount of the recording position from the prescribed reference position. The recording clock generation circuit 230 acts as the offset amount changing section 202 (FIG. 12) for changing the offset amount of the data recording position with respect to the prescribed reference position such that the offset amount approaches the target value as the recording of data proceeds. The power control circuit 215 and the light beam driving circuit 216 act together as the recording section 204 (FIG. 12) for recording the data at the data recording position of the optical disc 100.

The optical disc apparatus 201 synchronizes the frequency or phase of the recording clock to the frequency or phase of the reproduction clock which is obtained based on the data recorded on the optical disc 100. After the data recording is started, the optical disc apparatus 201 changes the frequency or phase of the recording clock at a prescribed time constant. Thus, the position at which the data is actually recorded can be offset with respect to the position at which the data should be recorded (the prescribed reference position). As the recording proceeds, the offset amount from the position at which the data should be recorded (the prescribed reference position) can be changed. The position at which the data should be recorded (the prescribed reference position) is, for example, the position where the land pre-pit overlaps the center of the 14T long recording mark or space. The maximum tolerable offset amount from the position at which the data should be recorded (the prescribed reference position) is, for example, 2T.

Figure 16:
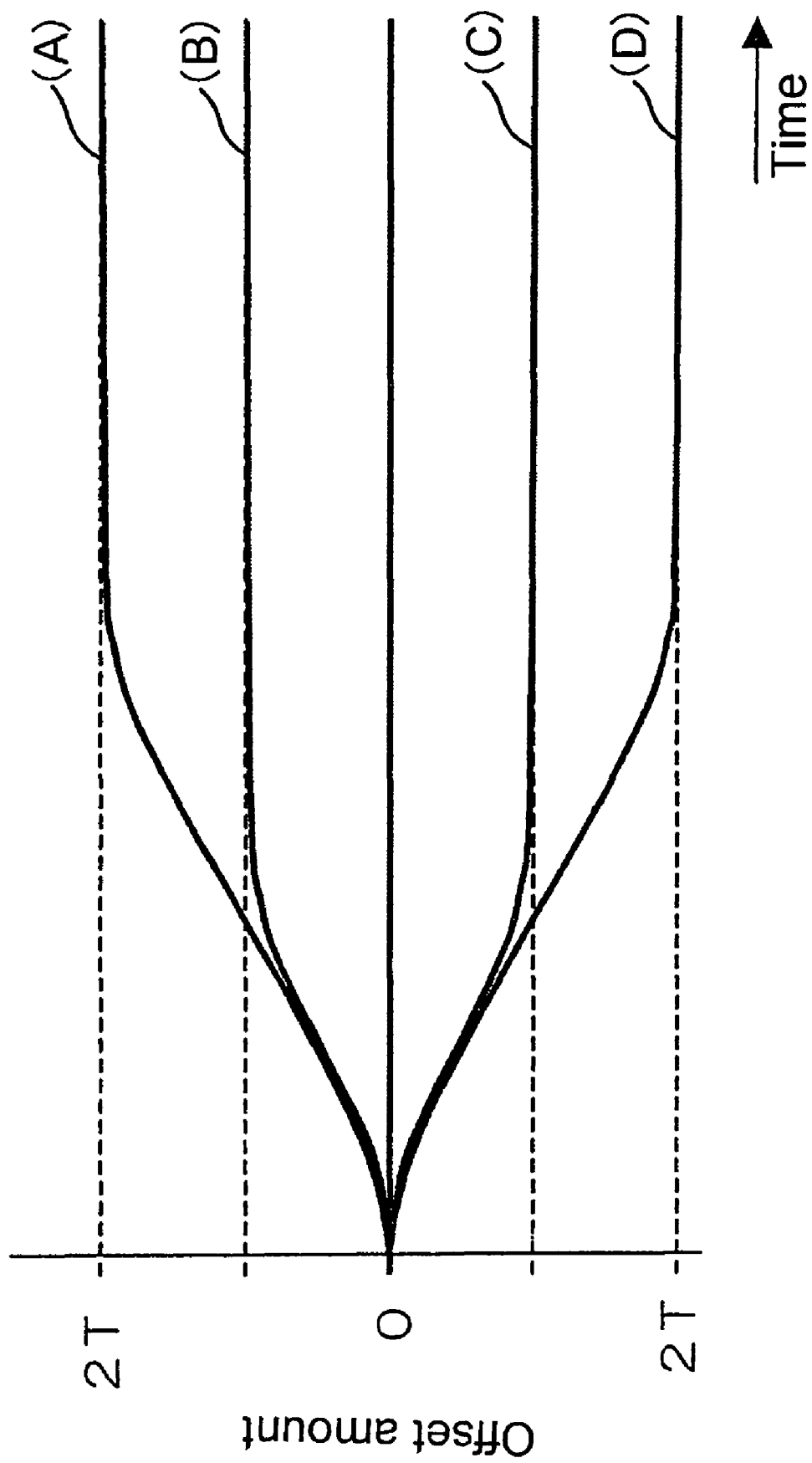
FIG. 16 is a graph illustrating the manner by which the offset amount from the position at which the data should be recorded (the prescribed reference position) is changed as the data recording proceeds.

FIG. 16 is a graph illustrating the manner by which the offset amount from the position at which the data should be recorded (the prescribed reference position) is changed as the data recording proceeds. The final offset amount (target value of the offset amount) is set by the parameter value changing section 203 to be within the maximum tolerable offset amount from the position at which the data should be recorded (the prescribed reference position), for example, 2T.

The final offset amount (target value of the offset amount) may be selected from a prescribed number of candidate values including, for example, 2T, T, 0, −T and −2T, randomly or in a prescribed order. Alternatively, the final offset amount (target value of the offset amount) may be calculated based on a prescribed equation.

In FIG. 16, solid line A shows how the offset amount changes when the target value of the offset amount is set to 2T. Solid line B shows how the offset amount changes when the target value of the offset amount is set to T. Solid line C shows how the offset amount changes when the target value of the offset amount is set to −T. Solid line D shows how the offset amount changes when the target value of the offset amount is set to −2T.

FIG. 17A is a timing diagram illustrating an operation of the first timing signal generator 236 (FIG. 13).

In response to the pre-pit sync signal which is output from the pre-pit sync detection circuit 223, the count value of the counter built in the first timing signal generator 236 is preset to "24". The counter counts the number of edges (rising edges or falling edges) of the recording clock. When the count value of the counter reaches "46", the first timing signal generator 236 outputs an "L" level signal. When the count value of the counter reaches "139", the first timing signal generator 236 outputs an "H" level signal. When the count value of the counter reaches "185", the count value is reset to "0". In this manner, the first timing signal generator 236 outputs the first rectangular wave having the "H" level and the "L" level alternately. The first rectangular wave has a cycle of 186T.

Figure 17B:
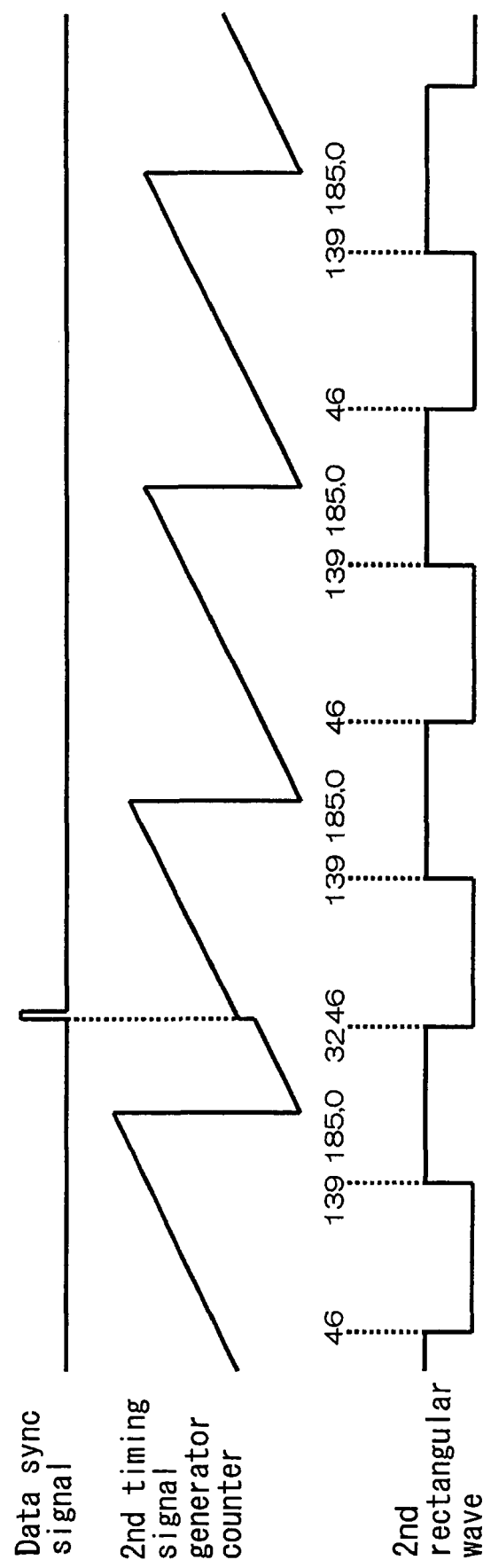
FIG. 17B is a timing diagram illustrating an operation of a second timing signal generator 237 shown in FIG. 13.

FIG. 17B is a timing diagram illustrating an operation of the second timing signal generator 237 (FIG. 13).

In response to the data sync detection signal which is output from the data sync detection circuit 226, the count value of the counter built in the second timing signal generator 237 is preset to "32". The counter counts the number of edges (rising edges or falling edges) of the recording clock. When the count value of the counter reaches "46", the second timing signal generator 237 outputs an "L" level signal. When the count value of the counter reaches "139", the second timing signal generator 237 outputs an "H" level signal. When the count value of the counter reaches "185", the count value is reset to "0". In this manner, the second timing signal generator 237 outputs the second rectangular wave having the "H" level and the "L" level alternately. The second rectangular wave has a cycle of 186T.

The first rectangular wave and the second rectangular wave are adjusted such that the phase difference therebetween is "0" unless the data recording position is offset. Accordingly, when the data recording position is offset forward, the second rectangular wave has a phase forward with respect to that of the first rectangular wave. When the data recording position is offset rearward, the second rectangular wave has a phase rearward with respect to that of the first rectangular wave.

Figure 18:
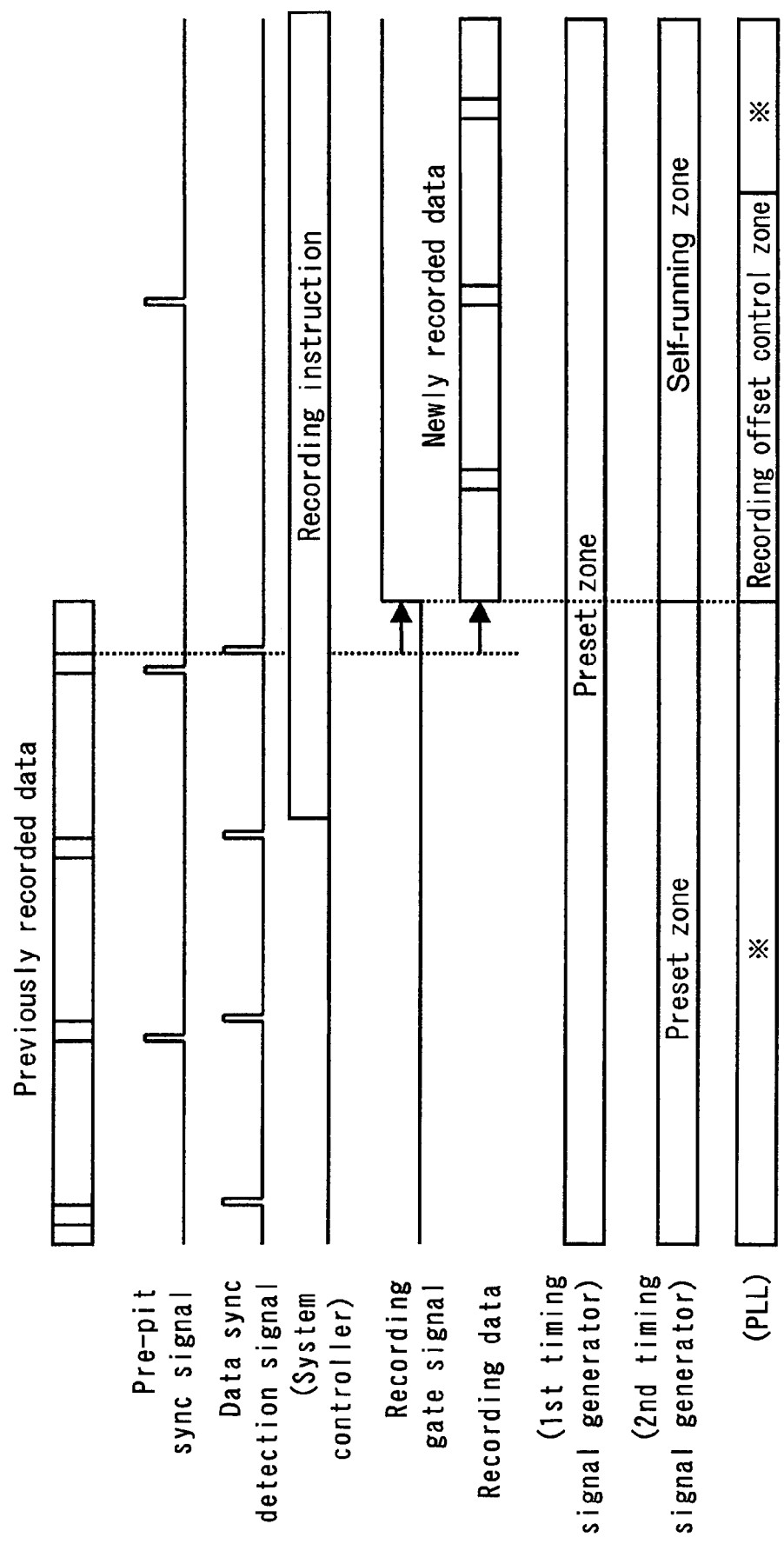
FIG. 18 is a timing diagram illustrating the timing to start a data recording operation.

FIG. 18 is a timing diagram illustrating the timing at which the recording operation of data is started.

Upon receiving the instruction from the system control section 232 to start the recording operation, the recording control circuit 233 operates in accordance with a timer (not shown) which operates in response to the recording clock. The recording control circuit 233 outputs a recording gate signal (rising) in response to a data sync detection signal.

When the recording gate signal is output, each of the circuits of the optical disc apparatus 201 starts the recording operation, and the count value of the counter built in the second timing signal generator 237 is prohibited from being preset.

When the data recording position is offset forward, the second rectangular wave having a phase forward with respect to that of the first rectangular wave immediately after the data recording operation is started is output. When the data recording position is offset rearward, the second rectangular wave having a phase rearward with respect to that of the first rectangular wave immediately after the data recording operation is started is output. After the data recording operation is started, the phase of the first rectangular wave and the phase of the second rectangular wave change in accordance with the control on the recording offset. The phase difference detector 238 detects the difference between the phase of the first rectangular wave and the phase of the second rectangular wave, and outputs the first phase differential signal representing the result of the detection. The filter 239 outputs a correction amount signal, which is obtained by limiting the time-axis change amount of the first phase differential signal.

Before the data recording operation is started, the PLL circuit 240 is in the state of controlling the recording clock in accordance with the pre-pit signal and the wobble signal. After the data recording operation is started, the correction amount signal and the parameter value are added to the loop of the PLL circuit 240 so as to control the frequency of the recording clock. Specifically, when the data recording position is to be offset rearward, the frequency of the recording clock is decreased such that the phase of the second rectangular wave is offset rearward with respect to the phase of the first rectangular wave. When the data recording position is to be offset forward, the frequency of the recording clock is increased such that the phase of the second rectangular wave is offset forward with respect to the phase of the first rectangular wave.

The above-described operation is performed immediately after the data recording operation is started and repeated until the offset amount with respect to the position at which the data should be recorded (the prescribed reference position) reaches the target value of the offset amount (parameter value). When the offset amount reaches the target value of the offset amount (parameter value), the PLL circuit 240 is switched to the state of controlling the frequency of the recording clock in accordance with the pre-pit signal and the wobble signal. Thus, at the connection point of the previously recorded data and the newly recorded data, the data is recorded based on the data sync detection signal. Therefore, a data continuity is obtained, and also the offset amount of the data recording position can be changed as the data recording proceeds.

In the above description, the PLL circuit 240 has a structure of controlling a recording clock in accordance with the pre-pit signal and the wobble signal. The structure of the PLL circuit 240 is not limited to this, and may have another structure. The parameter value may be subtracted in advance from the correction amount signal or the first phase differential signal.

For example, in the above description, the phase shift frequency-divided clock, which is one input to the phase difference comparator 242, is further shifted in accordance with the correction amount signal and the parameter value. Alternatively, the wobble signal which has passed through the noise filter 241, which is the other input to the phase difference comparator 242, may be further shifted. Still alternatively, the parameter value which has passed through the inverter and the correction amount signal may be converted into a voltage level signal, and then the voltage level signal may be added to the output from the charge pump 243 in an analog manner. Substantially the same effect is provided.

As described above, according to the second example of the present invention, recording of new data is started based on the termination position of data which has been recorded on the optical disc, and the offset amount of the data recording position can be changed such that the offset amount approaches the target value of the offset amount as the data recording operation proceeds. Each time new data is to be recorded on the optical disc, the target value of the offset amount can be changed. Thus, even when the same data is required to be recorded at the same position of the optical disc, the same data can be recorded at slightly different positions. As a result, the decrease in the number of rewritable times of the optical disc can be suppressed.

EXAMPLE 3

FIG. 19 is a block diagram illustrating a schematic structure of an optical disc apparatus 301 according to a third example of the present invention. In FIG. 19, elements identical to those of FIG. 13 (Example 2) bear identical reference numerals thereto.

The optical disc apparatus 301 includes a spindle motor 212, a pickup 213, a motor driver 214, a power control circuit 215, a light beam driving circuit 216, a reproduction amplifier 217, a pre-pit reproduction circuit 218, a wobble reproduction circuit 219, a data reproduction circuit 220, a reproduction clock generation circuit 221, a pre-pit window protection circuit 222, a pre-pit sync detection circuit 223, a pre-pit demodulation circuit 224, a pre-pit address extraction circuit 225, a data sync detection circuit 226, a data sync window protection circuit 227, an 8/16 demodulation circuit 228, an data ID extraction circuit 229, a recording clock generation circuit 250, a lock detection circuit 231, a system control section 232, a recording control circuit 233, an error correction circuit 234, and an 8/16 modulation circuit 235.

The recording clock generation circuit 250 includes a PLL circuit 240, a first timer 251, a second timer 252, a subtractor 253, and a filter 239.

The first timer 251 includes a counter (not shown) for counting the number of edges of a time clock (rising edges or falling edges) and outputting the count value as a first timer value. The count value of the counter is preset to a prescribed value in response to the pre-pit sync signal. When the pre-pit sync signal is not input to the first timer 251, the first timer 251 resets the count value of the counter to "0" every frame (1488 counts). The timer is preset in response to the pre-pit sync signal regardless of whether data is recorded (the recording gate signal is output) or not (the recording gate signal is not output).

The second timer 252 includes a counter (not shown) for counting the number of edges of a time clock (rising edges or falling edges) and outputting the count value as a second timer value. The count value of the counter is preset to a prescribed value in response to the data sync detection signal. When the data sync detection signal is not input to the second timer 252, the second timer 252 resets the count value of the counter to "0" every frame (1488 counts). The timer is preset in response to the data sync detection signal only in the case of non-recording (the recording gate signal is not output).

In this example, the recording clock is used also as the time clock.

The preset values of the first timer 251 and the second timer 252 are designed such that when the land pre-pit and the center of the 14T long recording mark or space of the sync section of the data are recorded in an overlapping state, the difference between the first timer value and the second timer value is 0.

The subtractor 253 operates only in the case of recording (the recording gate signal is output), and outputs a differential signal indicating the difference between the first timer value and the second timer value.

The filter 239 outputs a correction amount signal, which is obtained by limiting the time-axis change amount of the differential signal which is output from the subtractor 253. The filter 239 is realized by using, for example, an LPF (Low Pass Filter). The time-axis change amount of the differential signal is limited such that the response speed of the data reproduction PLL of an apparatus for reproducing data which has been recorded on an optical disc by the optical disc apparatus in this example can be sufficiently tracked by generation of the reproduction clock.

The PLL circuit 240 controls the frequency of the recording clock based on the pre-pit signal and the wobble signal. The PLL circuit 240 also controls the frequency of the recording clock such that the correction amount signal from the filter 239 (i.e., the difference between the first timer value and the second timer value) approaches the parameter value from the system control section 232.

For example, the PLL circuit 240 may have substantially the same structure as that of the PLL circuit 240 (FIG. 15) described in the second example. Thus, at the connection point of the previously recorded data and the newly recorded data, the data is recorded based on the data sync detection signal. Therefore, a data continuity is obtained, and also the offset amount of the data recording position can be changed as the data recording proceeds.

The correction amount can be derived by finding the timer values. Therefore, the recording clock generation circuit 250 can advantageously be fabricated with only a digital circuit. The operations of the subtractor 253, the filter 239 and the like can be implemented by software. In this way, the circuit scale of the recording clock generation circuit 250 can be reduced, and the filter characteristics can be easily changed.

As described above, according to the second and third examples of the present invention, where data has been recorded before the position at which new data is to be recorded, the data recording is performed based on a data sync detection signal. Therefore, the recording start point is not offset with respect to the previously recorded data. After the data recording operation is started, the data recording position is offset at a prescribed time constant. On this feature, the recording method of the second and third examples of the present invention are different from the conventional SPS (Start Position Shift) method by which the recording start point itself is offset. According to the SPS method, the recording start point itself is offset, and therefore a data discontinuity occurs as a result of linking. By contrast, according to the recording method of the second and third examples of the present invention, the recording start point is not offset. Therefore, a data discontinuity by linking can be prevented. Still, the recording method of the second and third examples of the present invention, by which the data recording position is finally shifted, provides the same effect as that of the SPS method.

OTHER EXAMPLES

In the above examples, DVD-RW discs are used as an exemplary recording medium. The present invention is applicable to other rewritable optical discs and recording mediums other than the optical discs, as well as DVD-RW discs. Instead of the 8/16 modulation, other modulation rules may be used. A storage section for storing previously used parameter values may be provided, such that the parameter value changing sections 102, 203, the DSV initial value changing section 103, and the state initial value changing section 104 may randomly select the parameter value to be set from the parameter values which are different from the previously used parameter values.

The parameter value changing sections 102, 203, the DSV initial value changing section 103, and the state initial value changing section 104 may store a prescribed order (for example, state 1, then state 3, then state 2; or DSV=0, then DSV=1, then DSV=−1; or offset amount 0, then offset amount 2T, then offset amount −T), such that the parameters can be switched in such a prescribed order each time new data is to be recorded. Either the DSV initial value changing section 103 or the state initial value changing section 104 may be omitted.

The first example may be combined with the second example or the third example. For example, the parameter value changing section 102 in the first example may be provided in the optical disc apparatus 201 in the second example or in the optical disc apparatus 301 in the third example. The DSV initial value changing section 103 or the state initial value changing section 104 may be provided in the system control section 232 of the second example or the third example, such that the initial value of the DSV or the initial value of the state may be changed. In this case, the pattern to be recorded may be changed as well as the recording position. Thus, the decrease in the number of rewritable times of an optical disc can be further suppressed.

According to the present invention, even when the same data is recorded at the same position repeatedly, the same data can be recorded with different patterns at the same position or the same data can be recorded at slightly different positions. As a result, the deterioration of the recording thin film of a recording medium is suppressed, and thus the decrease in the number of rewritable times of the recording medium can be suppressed. Therefore, the present invention is useful for, for example, a recording apparatus and a recording method for recording data on a rewritable recording medium and for a rewritable recording medium.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording apparatus for recording modulated data on a rewritable recording medium, the recording apparatus comprising:
   a data modulation section for modulating data in accordance with a prescribed modulation rule;
   a parameter value changing section for changing at least one parameter value of the prescribed modulation rule; and
   a recording section for recording the data modulated in accordance with the prescribed modulation rule on the recording medium,
   wherein the prescribed modulation rule is at least one of
      (a): a modulation rule that uses state modulation; or
      (b): a modulation rule that uses a digital sum value, and
   in the instance (a) where the prescribed modulation rule is a modulation rule that uses state modulation, the at least one parameter value is an initial value of a state; and
   in the instance (b) where the prescribed modulation rule is a modulation rule that uses a digital sum value, the at least one parameter value is the initial value or the target value of the digital sum value.

2. A recording apparatus according to claim 1, wherein the prescribed modulation rule is a modulation rule that uses state modulation, and the at least one parameter value is an initial value of a state.

3. A recording apparatus according to claim 1, wherein the prescribed modulation rule uses a digital sum value, and the at least one parameter value is an initial value of the digital sum value.

4. A recording apparatus according to claim 1, wherein the parameter value changing section changes the at least one parameter value randomly.

5. A recording apparatus according to claim 1, wherein the parameter value changing section changes the at least one parameter value in a prescribed order.

6. A recording apparatus according to claim 1, further comprising a storage section for storing a previously used parameter value, wherein the parameter value changing section randomly selects a parameter value to be set from parameter values which are different from the previously used parameter value.

7. A recording method for recording modulated data on a rewritable recording medium, the recording method comprising the steps of:
   modulating data in accordance with a prescribed modulation rule;
   changing at least one parameter value of the prescribed modulation rule; and
   recording the data modulated in accordance with the prescribed modulation rule on the recording medium,
   wherein the prescribed modulation rule is at least one of
      (a): a modulation rule that uses state modulation; or
      (b): a modulation rule that uses a digital sum value, and in the instance (a) where the prescribed modulation rule is a modulation rule that uses state modulation, the at least one parameter value is an initial value of a state; and in the instance (b) where the prescribed modulation rule is a modulation rule that uses a digital sum value, the at least one parameter value is the initial value or the target value of the digital sum value.

8. A recording apparatus for starting to record a series of recording data from a prescribed position based on a termination position of data which has been recorded on a rewritable recording medium, the recording apparatus comprising:

an offset amount changing section for changing an offset amount of a recording position of each data included in the series of recording data from a prescribed reference position such that as the recording of the series of recording data proceeds, the offset amount of the recording position of each data from the prescribed reference position approaches a target value; and a recording section for recording each data on the recording medium based on an offset amount which reflects the changed parameter value.

9. A recording apparatus according to claim 8, wherein the parameter value changing section changes the parameter value randomly.

10. A recording apparatus according to claim 8, wherein the parameter value changing section changes the parameter value in a prescribed order.

11. A recording apparatus according to claim 9, further comprising a storage section for storing a previously used parameter value, wherein the parameter value changing section randomly selects a parameter value to be set from parameter values which are different from the previously used parameter value.

12. A recording method for starting to record a series of recording data from a prescribed position based on a termination position of data which has been recorded on a rewritable recording medium, the recording method comprising the steps of:

changing an offset amount of a recording position of each data included in the series of recording data from a prescribed reference position such that as the recording of the series of recording data proceeds, the offset amount of the recording position of each data from the prescribed reference position approaches a target value; and recording each data on the recording medium based on an offset amount which reflects the changed parameter value.

* * * * *

UNITED STATES PATENT AND TRADEMARK OFFICE
CERTIFICATE OF CORRECTION

PATENT NO. : 7,319,645 B2
APPLICATION NO. : 10/633769
DATED : January 15, 2008
INVENTOR(S) : Junichi Minamino, Hironori Deguchi and Toshiya Akagi It is certified that error appears in the above-identified patent and that said Letters Patent is hereby corrected as shown below:

Column 24, line 1, "claim 9" should read -- claim 8 --.

Signed and Sealed this

Twelfth Day of August, 2008

JON W. DUDAS
*Director of the United States Patent and Trademark Office*